US008200928B2

(12) United States Patent
Arakawa et al.

(10) Patent No.: US 8,200,928 B2
(45) Date of Patent: *Jun. 12, 2012

(54) STORAGE SYSTEM AND REMOTE COPY CONTROL METHOD FOR STORAGE SYSTEM

(75) Inventors: Hiroshi Arakawa, Sagamihara (JP);
Kenta Ninose, Yokohama (JP); Akira Deguchi, Yokohama (JP); Katsuhiro Okumoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,386

(22) Filed: May 17, 2011

(65) Prior Publication Data

US 2011/0219189 A1  Sep. 8, 2011

Related U.S. Application Data

(63) Continuation of application No. 11/603,088, filed on Nov. 22, 2006, now Pat. No. 7,945,750.

(30) Foreign Application Priority Data

Mar. 28, 2006  (JP) ................................. 2006-087983

(51) Int. Cl.
*G06F 12/00* (2006.01)
*G06F 13/00* (2006.01)
*G06F 13/28* (2006.01)
(52) U.S. Cl. .......................... 711/162; 711/151; 711/167
(58) Field of Classification Search ................... 711/162
See application file for complete search history.

(56) References Cited

U.S. PATENT DOCUMENTS

| 5,404,548 | A | 4/1995 | Nishioka |
| 5,603,003 | A | 2/1997 | Akizawa et al. |
| 5,623,599 | A | 4/1997 | Shomler |
| 5,996,054 | A | 11/1999 | Ledain et al. |
| 6,092,066 | A | 7/2000 | Ofek |

(Continued)

FOREIGN PATENT DOCUMENTS

EP  0 672 985 A1  9/1995

(Continued)

OTHER PUBLICATIONS

Storage.com, "The Role of Backup in Data Recovery", pp. 1-3.

(Continued)

*Primary Examiner* — Brian Peugh
*Assistant Examiner* — Prasith Thammavong
(74) *Attorney, Agent, or Firm* — Antonelli, Terry, Stout & Kraus, LLP.

(57) ABSTRACT

A storage system maintains consistency of the stored contents between volumes even when a plurality of remote copying operations are executed asynchronously. A plurality of primary storage control devices and a plurality of secondary storage control devices are connected by a plurality of paths, and remote copying is performed asynchronously between respective first volumes and second volumes. Write data transferred from the primary storage control device to the secondary storage control device is held in a write data storage portion. Update order information, including write times and sequential numbers, is managed by update order information management portions. An update control portion collects update order information from each update order information management portion, determines the time at which update of each second volume is possible, and notifies each update portion. By this means, the stored contents of each second volume can be updated up to the time at which update is possible.

3 Claims, 23 Drawing Sheets

U.S. PATENT DOCUMENTS

| | | | |
|---|---|---|---|
| 6,157,991 | A | 12/2000 | Arnon |
| 6,209,002 | B1 | 3/2001 | Gagne et al. |
| 6,260,124 | B1 | 7/2001 | Crockett et al. |
| 6,353,878 | B1 | 3/2002 | Dunham |
| 6,366,987 | B1 | 4/2002 | Tzelnic et al. |
| 6,408,370 | B2 | 6/2002 | Yamamoto et al. |
| 6,463,501 | B1 | 10/2002 | Kern et al. |
| 6,581,143 | B2 | 6/2003 | Gagne et al. |
| 6,647,474 | B2 | 11/2003 | Yanai et al. |
| 6,658,434 | B1 | 12/2003 | Watanabe et al. |
| 6,658,542 | B2 | 12/2003 | Beardsley et al. |
| 6,665,781 | B2 | 12/2003 | Suzuki et al. |
| 6,816,951 | B2 | 11/2004 | Kimura et al. |
| 6,898,685 | B2 | 5/2005 | Meiri et al. |
| 6,950,915 | B2 | 9/2005 | Ohno et al. |
| 7,330,948 | B2 * | 2/2008 | Deguchi et al. ............... 711/162 |
| 2002/0078296 | A1 | 6/2002 | Nakamura et al. |
| 2003/0050930 | A1 | 3/2003 | Mosher, Jr. et al. |
| 2003/0051111 | A1 | 3/2003 | Nakano et al. |
| 2003/0078903 | A1 | 4/2003 | Kimura et al. |
| 2003/0177321 | A1 | 9/2003 | Watanabe |
| 2003/0188116 | A1 | 10/2003 | Suzuki et al. |
| 2004/0024975 | A1 | 2/2004 | Morishita et al. |
| 2004/0078399 | A1 | 4/2004 | Tabuchi et al. |
| 2004/0128442 | A1 | 7/2004 | Hinshaw et al. |
| 2004/0148477 | A1 | 7/2004 | Cochran |
| 2004/0193802 | A1 | 9/2004 | Meiri et al. |
| 2004/0193816 | A1 | 9/2004 | Meiri et al. |
| 2004/0193820 | A1 | 9/2004 | Meiri et al. |
| 2004/0250030 | A1 | 12/2004 | Ji et al. |
| 2004/0250031 | A1 | 12/2004 | Ji et al. |
| 2004/0260972 | A1 | 12/2004 | Ji et al. |
| 2004/0267829 | A1 | 12/2004 | Hirakawa et al. |
| 2004/0268177 | A1 | 12/2004 | Ji et al. |
| 2005/0033828 | A1 | 2/2005 | Watanabe |
| 2005/0066122 | A1 | 3/2005 | Longinov et al. |
| 2005/0091415 | A1 | 4/2005 | Armitano |
| 2005/0102554 | A1 | 5/2005 | Zohar et al. |
| 2005/0120056 | A1 | 6/2005 | Meiri et al. |
| 2005/0120092 | A1 | 6/2005 | Nakano et al. |
| 2005/0125465 | A1 | 6/2005 | Arakawa et al. |
| 2005/0125617 | A1 | 6/2005 | Ninose et al. |
| 2005/0132248 | A1 | 6/2005 | Lecrone et al. |
| 2005/0149666 | A1 | 7/2005 | Meiri et al. |
| 2005/0149817 | A1 | 7/2005 | Biran et al. |
| 2005/0198454 | A1 | 9/2005 | Yoder et al. |

FOREIGN PATENT DOCUMENTS

| | | |
|---|---|---|
| EP | 0 674 263 A1 | 9/1995 |
| EP | 0 671 686 | 4/1998 |
| EP | 1 150 210 A2 | 10/2001 |
| EP | 1 217 523 A1 | 6/2002 |
| EP | 1 538 527 A2 | 6/2005 |
| JP | 6-149485 | 5/1994 |
| JP | 2002-189570 | 7/2002 |
| JP | 2004-013367 | 1/2004 |
| JP | 2005-190455 | 7/2005 |
| JP | 2005-190456 | 7/2005 |
| JP | 2006-039976 | 2/2006 |
| JP | 2006-099495 | 4/2006 |
| WO | WO 01/16748 | 3/2001 |
| WO | WO 2005/031578 | 4/2005 |

OTHER PUBLICATIONS

SDRF/Asynchronous: A Technical Description, EMC White Paper, EMC Corporation, Feb. 2004, pp. 1-13.

* cited by examiner

STORAGE SYSTEM AND REMOTE COPY CONTROL METHOD FOR STORAGE SYSTEM

CROSS-REFERENCE TO RELATED APPLICATIONS

This is a continuation of U.S. application Ser. No. 11/603,088, filed Nov. 22, 2006 now U.S. Pat. No. 7,945,750. This application relates to and claims priority from Japanese Patent Application No. 2006-087983, filed on Mar. 28, 2006. The entirety of the contents and subject matter of all of the above is incorporated herein by reference.

BACKGROUND OF THE INVENTION

1. Field of the Invention

This invention relates to a storage system and to a remote copy control method for a storage system.

2. Description of the Related Art

In the computer systems of recent years, the quantities of data used are increasing, and data is also updated with increasing frequency. Hence methods for backing up such data, or for promptly restoring a normal operating state after occurrence of a fault, are vital issues for storage technology.

As one solution to such problems, technology has been proposed in which, for example, a plurality of storage control devices are placed in both a primary site and a secondary site, mutually separated, each of the storage control devices at the primary site (primary storage control devices) and each of the storage control devices at the secondary site (secondary storage control devices) are connected by transfer paths, and data managed at the two sites is synchronized (Japanese Patent Laid-open No. 2004-13367). In this technology of the prior art, a so-called remote copy technology is used in which data updated by a primary storage control device is transferred and copied to a secondary storage control device, without passing through a host computer (hereafter "host").

As technology to ensure consistency between primary storage control devices and secondary storage control devices, a method using the write time has also been proposed (European Patent No. 0671686). In this technology of the prior art, a primary storage control device which has received write data from a primary host reports completion of reception of write data to the host immediately after receiving the write data. The primary host, after receiving the report from the primary storage control device, reads a copy of the write data from the primary storage control device. The time at which the write request was issued from the primary host (the write time) is added to the read-out write data. The primary host transfers the read-out write data and write time to a secondary host. The secondary host references the write time added to each write data set, and writes the write data sets, in the order of the write time, to a secondary storage control device. By this means, consistency is maintained between data stored in the primary storage control device and data stored in the secondary storage control device.

In the above technology of the prior art, because the primary host and secondary host constantly perform data transfer and reflection processing (processing to write data to a volume in the order of the write time), the load on each host is considerable. It is necessary that each host always be running, and moreover it is necessary that software to execute the above-described data transfer processing and reflection processing always be running.

When remote copy paths are set between a plurality of primary storage control devices and a plurality of secondary storage control devices, and parallel processing of a plurality of remote copy tasks is performed simultaneously, at a certain time, the write data received by each of the secondary storage control devices will differ. Remote copy processing is asynchronous processing, performed with a timing different from the timing with which write requests are received from a primary host. Hence a plurality of remote copy tasks are each executed with arbitrary timing. As a result, circumstances arise in which write data which has been received by one secondary storage control device has not yet been received by another secondary storage control device.

Thus when simultaneously executing a plurality of remote copy processing tasks between a primary site and a secondary site, because the states of progress of the various remote copy processing tasks differ, it is difficult to maintain data consistency.

SUMMARY OF THE INVENTION

This invention was devised in light of the above problems, and has as an object the provision of a storage system and a remote copy control method for a storage system which are able to maintain data consistency when transferring and updating data between a plurality of storage control devices. A further object of this invention is to provide a storage system and a remote copy control method for a storage system which, when performing remote copying between a plurality of storage control devices, are able to suspend operation when a fault is detected, while maintaining data consistency between the storage control devices. Further objects of the invention will become clear from the following descriptions of aspects of the invention.

In order to resolve the above problems, a storage system of this invention is a storage system which copies data between a plurality of storage control devices, and comprises a plurality of first storage control devices and a plurality of second storage control devices connected to the respective first storage control devices; each of the first storage control devices comprises a first logical volume, to store data input from and output to a higher-level device, and an update notification portion, which provides notification of data updating of the first logical volume by a higher-level device by transmitting, to a second storage control device, update data in association with update order information to specify the update order of the update data. The second storage control devices are mutually connected, and each comprises a second logical volume which is associated with the first logical volume and in which is stored a copy of data stored in a first logical volume; an update data storage portion, which stores update data received from an update notification portion; an update order information management portion, which manages update order information received from the update notification portion; and, an update portion, which, based on update order information, writes in order the update data stored in the update data storage portion to the second logical volume, to update the data stored in the second logical volume. The storage system further comprises an update control portion which, upon receiving a prescribed notification, collects update order information items from each of the update order information management portions, determines the time at which update of each of the second logical volumes is possible based on the collected update order information items, and, by notifying each of the update portions of the update-possible time thus determined, causes each of the update portions to update the data stored in each of the second logical volumes up to the update-possible time.

In one mode of the invention, each update portion updates data stored in a second logical volume up to the notified update-possible time, in the same order as the update order for the first logical volume.

In one mode of the invention, a prescribed notification is a registration instruction for a volume group comprising a plurality of second logical volumes.

In one mode of the invention, a prescribed notification is a notification of detection of a suspend factor.

In one mode of the invention, a prescribed notification is a notification of detection of a suspend factor; the update control portion, upon receiving a suspend factor detection notification, determines the update-possible time for each second logical volume based on each of the update order information items collected from the respective update order information management portions, and, by notifying each of the update portions of the update-possible time thus determined, causes each of the update portions to update the data stored in the second logical volumes up to the update-possible time; and, each of the second storage control devices halts copy processing causing storage of a copy of data of the first logical volume for second logical volumes related to the suspend factor detection notification, among all the second logical volumes.

In one mode of the invention, a suspend factor is a case in which a fault is detected.

In one mode of the invention, within each of the first storage control devices, a first volume group is established from one or a plurality of first logical volumes; within each of the second storage control devices, a second volume group is established from one or a plurality of second logical volumes; each of the first volume groups and each of the second volume groups are associated; and, the update control portion determines the update-possible time for each second volume group, and notifies each update portion related to second volume groups of the update-possible time thus determined.

In one mode of the invention, one or more extended volume groups are established from among the plurality of second volume groups, and the update control portion determines the update-possible time for each extended group, and notifies each second volume group belonging to an extended group of the update-possible time thus determined.

In one mode of the invention, when an instruction has been given to establish a volume group comprising one or more second logical volumes, the update control portion determines the update-possible time for this volume group, and notifies the update portion related to the second logical volumes belonging to the volume group of the update-possible time thus determined.

In one mode of the invention, the update control portion determines update-possible times based on the oldest update order information, among the newest update order information items received by each of the second storage control devices and managed by each of the update order information management portions.

In one mode of the invention, the update order information comprises times of issue of update requests by the higher-level device.

In one mode of the invention, the update order information comprises times of issue of update requests and order of issue of update requests by the higher-level device.

In one mode of the invention, the update control portion determines update-possible times when a suspend factor is detected, notifies the update-possible time thus determined and issues requests to halt updates to each of the update portions, and each update portion, after updating data stored in each second logical volume up to the update-possible time, halts updates of each second logical volume.

In one mode of the invention, upon detection of the occurrence of a fault which precludes the transfer of update data and update order information from each first storage control device to each second storage control device, the detection is judged to be detection of a suspend factor.

In one mode of the invention, for only a prescribed second logical volume related to a fault among all the second logical volumes, the update control portion determines the update-possible time, and notifies the update portion of the prescribed second logical volume of the update-possible time thus determined and of an update halt request.

In one mode of the invention, an update control portion is provided in at least one among the second storage control devices.

A remote copy control method of a storage system according to another perspective of the invention is a remote copy control method, in a storage system comprising a plurality of first storage control devices and a plurality of second storage control devices connected to the respective first storage control devices, in which data is transferred from each of the first storage control devices and copied to each of the second storage control devices, the method executing a step of establishing remote copy pairs, by associating the first logical volumes of the respective first storage control devices with the second logical volumes of the respective second storage control devices; a step of receiving an update request for a first logical volume from a higher-level device; a step of writing update data related to the update request to the first logical volume, to update the data stored in the first logical volume; a step of associating the update data with update order information to specify the update order of update data, and of causing the transfer of the update data and associated update order information from each first storage control device to each second storage control device; a step of writing, in order, the update data to the second logical volume based on the update order information, to update the data stored in the second logical volume; a step of collecting each of the update order information items from each second storage control device; a step, upon receiving a prescribed notification, of determining the time at which update of each second logical volume is possible, based on each of the collected update order information items; and, a synchronization step of notifying each of the second storage control devices of the determined update-possible times, and of causing updates of data stored in each second logical volume up to the update-possible time.

Further, upon detection of a fault which precludes the transfer of the update data and update order information from each of the first storage control devices to each of the second storage control devices, a step can be further executed in which update-possible times are determined based on each update order information item, each of the second storage control devices is notified of the update-possible times thus determined and the remote copy halt request, and after updating the data stored in each second logical volume up to the update-possible times, remote copy processing from each of the first logical volumes to each of the second logical volumes is halted.

A storage system according to still another perspective of the invention is a storage system which copies data between a plurality of storage control devices, and comprises a first site and a second site; the first site comprises a plurality of first storage control devices each having a plurality of first logical volumes, and a higher-level device, connected to the respective first storage control devices, which performs data input to and output from each first logical volume; the second site comprises a plurality of second storage control devices mutually connected, and each having a plurality of second logical volumes; the first logical volumes form one or more first volume groups, and the second logical volumes form one or more second volume groups; each first logical volume belonging to a first volume group is associated with the second logical volume belonging to the second volume group, as a remote copy pair; each first storage control device comprises an update notification portion, which provides notification of data updates of each first logical volume by a higher-level device by transmitting, to each second storage control device, update data in association with update order information specifying the update order of the update data, and a suspend request notification portion, which notifies each second storage control device of a suspend request to halt remote copy operation; and, each second storage control device comprises an update data storage portion which stores update data received from an update notification portion, an update order information management portion which manages update order information received from an update notification portion, and an update portion which, based on update order information, updates the data stored in a second logical volume by writing, in order, the update data stored in the update data storage portion to the second logical volume. Further, a prescribed second storage control device among the plurality of second storage control devices comprises an update control portion to synchronize update processing of each of the second logical volumes by each of the second storage control devices; the update control portion, upon receiving a prescribed notification, collects the update order information from each of the update order information management portions, determines the update-possible time for each second logical volume based on the collected update order information, and, by notifying each update portion of the update-possible times thus determined, causes the data stored in each second logical volume to be updated up to the update-possible times by the update portions.

As explained below, this invention can also be represented as for example a control method for a remote copy system. That is, in a control method for a remote copy system which copies data between a plurality of storage device systems, the remote copy system has a plurality of first storage device systems which perform input/output of data to and from a computer, and a plurality of second storage device systems connected to the respective first storage device systems; each first storage device system has a first logical volume, in which is stored input/output data; each second storage device system has a second logical volume, in which is stored a replica of the data stored in a first logical volume; at least one among the plurality of second storage device systems has a master processing portion; and the remote copy system control method comprises a step of receiving a registration instruction and issuing a reflection processing modification instruction to a second storage device system, a step of collecting arrived times from each second storage device system and determining reflection-possible times, a step of notifying second storage device systems of reflection-possible times, and a step of causing second storage device systems to store write data in second logical volumes up to the notified reflection-possible times, for write data transferred from first storage device systems.

This invention can also be represented as a remote copy system. That is, a remote copy system which copies data between a plurality of storage device systems has a plurality of first storage device systems which perform input/output of data to and from a computer, and a plurality of second storage device systems connected to the respective first storage device systems; each first storage device system has a first logical volume, in which is stored input/output data; each second storage device system has a second logical volume, in which is stored a replica of the data stored in a first logical volume; at least one among the plurality of second storage device systems has a master processing portion; the master processing portion receives a registration instruction and issues a reflection processing modification instruction to a second storage device system; the second storage device system receives a modification instruction and performs reflection processing based on reflection-possible times; the master processing portion collects arrived times from second storage device systems, determines reflection-possible times, and notifies second storage device systems; and second storage device systems store write data in second logical volumes up to the notified reflection-possible times for write data transferred from first storage device systems.

There are cases in which at least a portion of the means, portions, or steps of the invention can be executed by a computer program. Such a computer program can be distributed in fixed form on various recording media, or can be transmitted via communication media.

DESCRIPTION OF THE PREFERRED EMBODIMENTS

Figure 1:
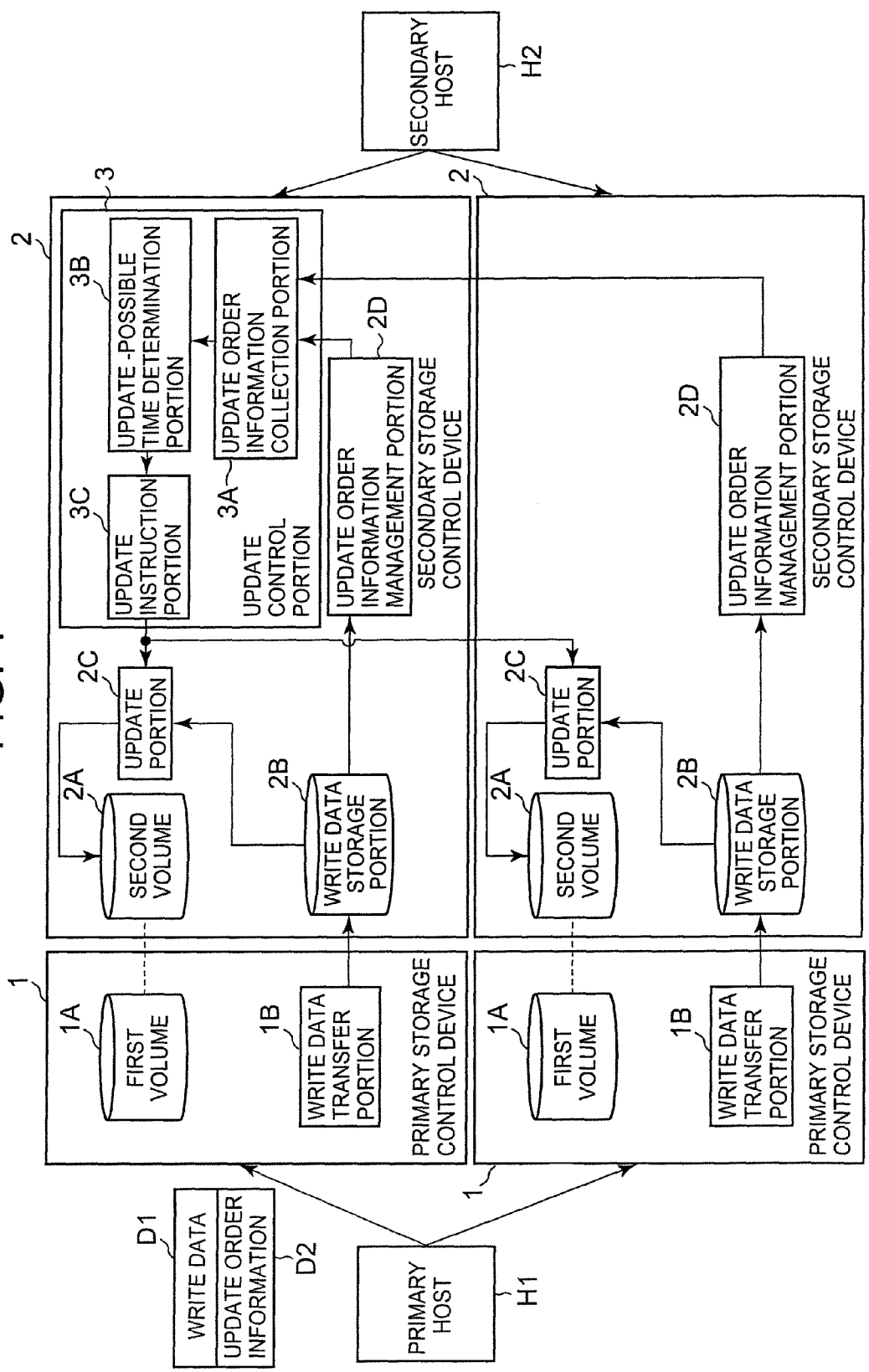
FIG. 1 is an explanatory diagram showing an overall concept of the invention.

Below, aspects of the invention are explained, based on the drawings. FIG. 1 is an explanatory diagram which schematically shows an overall concept of the invention. The storage system of this aspect comprises a primary site and a secondary site, at a distance from each other. For example, in consideration of the possibility of disasters, the primary site and secondary site are positioned in separate geographic regions. The primary site and secondary site are connected, in a manner enabling bidirectional communication, by for example dedicated lines, a WAN (Wide Area Network), or other communication lines.

A primary host H1 and a plurality of primary storage control devices 1 are provided at the primary site; a secondary host H2 and a plurality of secondary storage control devices 2 are provided at the secondary site. Each of the primary storage control devices 1 comprises a first volume 1A and a write data transfer portion 1B.

Each of the secondary storage control devices 2 comprises a second volume 2A, a write data storage portion 2B, an update portion 2C, and an update order information management portion 2D. Further, at least one secondary storage control device 2 comprises, in addition to 2A through 2D of the above configuration, an update control portion 3.

For convenience of explanation, one host each H1 and H2, and two storage control devices each 1 and 2, are shown in FIG. 1. However, configurations are not limited to this, and a greater number of hosts and storage control devices can be placed at each site.

Under normal circumstances, a user uses the primary site to perform various task processing and similar. As task processing, for example, processing of orders placed or received, inventory management processing, customer management processing, e-mail management processing, document management processing, and similar may be performed. A user accesses each of the primary storage control devices 1 via the primary host H1, and may write data to a first volume 1A, or read data stored in a first volume 1A.

At the primary site, data used by the user (user data) can be backed up. For example, the stored contents of a first volume 1A used during normal operation can be saved to a tape device, disk device, or other backup device, to protect user data. Further, old data the usage value of which has diminished after a prescribed time has elapsed from creation can be migrated from the first volume 1A to a backup device, to secure free space in the first volume 1A and reduce the operating cost of the storage system.

Even when user data is being protected at the primary site, in the event of a large-scale disaster or similar, there is the possibility of impediments to primary site operation. In this case, user task processing is halted for the long interval until the primary site recovers. Hence a secondary site is positioned in a location removed an appropriate distance from the primary site. The same data as the user data managed at the primary site is stored at the secondary site, in preparation for an unlikely disaster. A system prepared for such an unlikely event by managing user data at a plurality of sites physically distant from each other is called a disaster recovery system.

The stored contents of the first volume 1A at the primary site may conceivably be backed up to a tape device or similar, the tape device transported to the secondary site, and the stored contents of the second volume 2A updated. However, when using such a method, time and trouble must be taken to bring the stored contents of the primary site and secondary site into coincidence.

Hence the primary site and secondary site are connected by communication lines, and when data of the first volume 1A is updated, the newly written write data (update data) D1 is transferred to the secondary site, and the data of the second volume 2A is updated. The technique of transferring and copying data between different storage control devices is called remote copying.

A plurality of primary storage control devices 1 installed at the primary site are connected, via separate communication paths, to a plurality of secondary storage control devices 2 installed at the secondary site. Upon updating of data within the first volume 1A by the primary host H1, each write data transfer portion 2B transfers the write data D1 and update order information D2 to the secondary storage control device 2.

The update order information D2 is information used to specify the order of updating; for example, the time of the request by the primary host H1 for writing of write data (the write time), a sequential number, and similar may be included. The update order information D2 is information used to accurately reflect the update contents of the first volume 1A, which is the primary volume, in the second volume 2A, which is the secondary volume.

Upon receiving write data D1 and update order information D2 from the primary storage control device 1, the secondary storage control device 2 stores the write data D1 in the write data storage portion 2B. The update order information D2 is managed by the update order information management portion 2D. Based on the update order information D2, the update portion 2C reads the write data D1 stored in the write data storage portion 2B and overwrites the data of the second volume 2A according to the updated order.

Each of the first volumes 1A within each primary storage control device 1 store either mutually related data, or the same data. One first volume 1A is associated with one second volume 2A, to establish a remote copy pair. Another first volume 1A is associated with another second volume, to establish a separate remote copy pair. The data of each first volume 1A is mutually related, and so the data of each second volume 2A must also be consistent.

Remote copying is executed with respective arbitrary timing by each of the primary storage control devices 1. When a write request is issued from the primary host H1, each of the primary storage control devices, at the time the write data D1 is received, notifies the primary host H1 of the completion of processing of the write request, and thereafter transfers the write data D1 to a secondary storage control device 2 with separate timing.

A configuration is also possible in which a secondary storage control device 2 takes the initiative in performing remote copying. In this case, for example, the secondary storage control device 2 periodically queries the primary storage control device 1 to check for updates, and reads the write data D1 from the primary storage control device 1.

In this way, the issuing of a write request and the execution of remote copying are performed with different timing. Hence even when write requests are issued from the primary host H1 with the same timing, it is possible that write data may have arrived at one secondary storage control device 2 but write data has not yet arrived at another secondary storage control device 2.

Hence in the storage system of this aspect, an update control portion 3 is provided in a prescribed secondary storage control device among the plurality of secondary storage control devices 2. The update control portion 3 is provided to synchronize the states of progress of remote copying of the secondary storage control devices 2.

The update control portion 3 comprises, for example, an update order information collection portion 3A, update-possible time determination portion 3B, and update instruction portion 3C. The update order information collection portion 3A collects the latest update order information items D2 from each of the update order information management portions 2D. The update-possible time determination portion 3B selects, as an update-possible time, the write time indicated in the oldest update order information items among the latest update order information items collected. The update instruction portion 3C permits write data updates up to the update-possible time for each of the update portions 2C.

For convenience of explanation, here it is assumed that write data D1(N1a) of a write request issued at time N1a (write time), as well as write data D1(N2a) for write time N2a and write data D1(N3a) for write time N3a, each have arrived at one secondary storage control device 2. It is further assumed that write data D1(N1b) and D1(N2b) for write request issue times N1b and N2b respectively have arrived at another secondary storage control device 2. Here, numbers "1" and "2" are appended to the symbol "N" in the order of arrival of write data; but N1a and N1b are different times, as are N2a and N2b. Write times occur in the order N1→N2→N3.

The times at which each primary storage control device 1 receives the write request from the host H1 are varied, and so the write times of the write data D1 received by each secondary storage control device 2, although possibly coinciding on occasion, will in essence all be different.

The latest update order information managed by one secondary storage control device 2 is the information D2(N3a) for time N3a, and the latest update order information managed by another secondary storage control device 2 is information D2(N2b) for time N2b. Upon comparing the update order information D2(N3a) and the update order information D2(N2b), it is found that D2(N2b) is temporally earlier.

The update-possible time determination portion 3B determines the time N2b, indicated in the oldest update order information D2(N2b) among the latest update order information items D2(N3a) and D2(N2b), as the update-possible time. The update-possible time is the time (in this example, N2b) up until which write data updating is permitted. That is, the update-possible time indicates the point in time within which the stored contents of each of the secondary storage control devices 2 can be synchronized.

The update instruction portion 3C notifies the update portions 2C of each of the secondary storage control devices 2 of the update-possible time thus determined. Upon receiving this notification, each update portion 2C reads the write data D1 stored in the write data storage portion 2B, and writes to the second volume 2A, according to the update order.

In the above example, each update portion 2C, after writing the write data D1(N1) for write time N1 to the second volume 2A, writes the write data D1(N2) for write time N2 to the second volume 2A. One secondary storage control device 2 has also acquired write data D1(N3) for write time N3, but this write data D1(N3) is not written to the second volume 2A. This is because the write data D1(N3) has arrived after the update-possible time N2, and so writing to the second volume 2A is not permitted. By this means, the stored contents in each of the second volumes 2A can be made coincident at write time N2.

When time elapses and the write data D1(N3) arrives at the other secondary storage control device 2, N3 is selected as the new update-possible time, and the contents of each of the second volumes 2A are made to coincide at write time N3.

By means of the above-described configuration, this aspect has the following advantageous results. In this aspect, an update control portion 3 is provided to synchronize remote copying via various paths on the receiving side (secondary storage control device side) when performing remote copying via a plurality of paths. Hence each of the latest order information items D2 is collected from the update order information management portions 2D, and based on the collected update order information items D2, an update-possible time for each second volume 2A is determined, and the stored contents of each of the second volumes 2A are caused to be updated up to the update-possible time.

As a result, data consistency among the storage control devices 2 can be ensured without increasing the processing loads of the hosts H1 and H2. That is, the results of a plurality of remote copy processing tasks can be synchronized in a so-called host-free manner, improving convenience of use and reliability. Further, should a fault occur at the primary site, resulting in failover to the secondary site, data having consistency can be used to continue execution of user task processing, and the reliability of the storage system can be enhanced. Below, this aspect is explained in detail.

Embodiment 1

Figure 2:
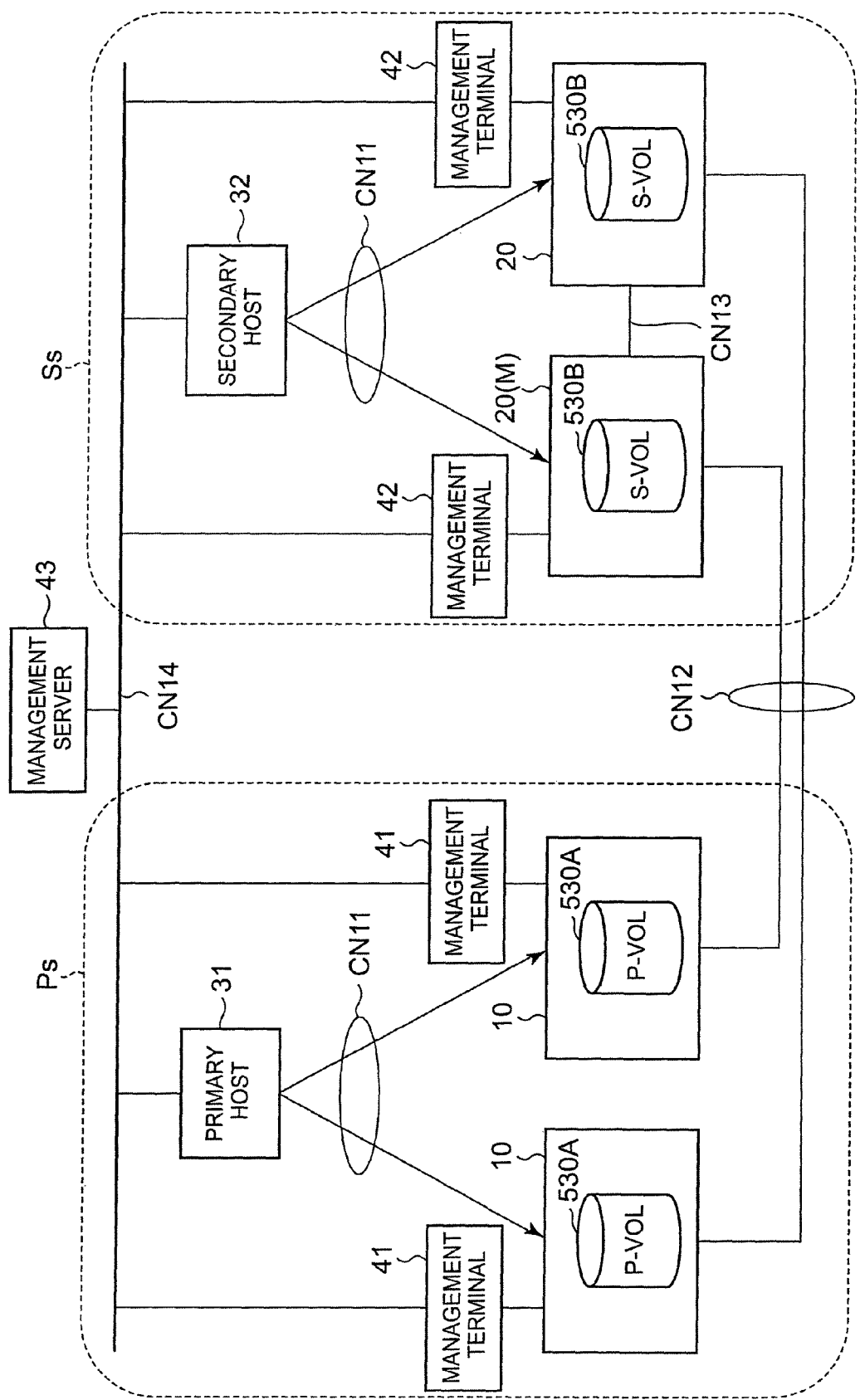
FIG. 2 is an explanatory diagram showing the entirety of the storage system of an aspect.

FIG. 2 is an explanatory diagram showing the entirety of the storage system of this embodiment. This storage system comprises for example a primary site Ps and secondary site Ss, as well as a management server 43 to manage the sites Ps and Ss.

The primary site Ps can comprise one or more primary hosts 31, a plurality of primary storage control devices 10, and management terminals 41 which manage each of the primary storage control devices 10. Similarly, the secondary site Ss can comprise one or more secondary hosts 32, a plurality of secondary storage control devices 20, and management terminals 42. With respect to the correspondence with FIG. 1, the primary host 31 and secondary host 32 correspond to the primary host H1 and secondary host H2 respectively in FIG. 1. The primary storage control devices 10 correspond to the primary storage control devices 1 in FIG. 1, and the secondary storage control devices 20 correspond to the secondary storage control devices 2 in FIG. 1. The primary volumes 530A correspond to the first volumes 1A in FIG. 1, and the secondary volumes 530B correspond to the second volumes 2A in FIG. 1.

First, the connection configuration of the primary site Ps is explained. The primary host 31 is connected to each of the primary storage control devices 10 via a SAN (Storage Area Network) or other data input/output paths CN11. The primary host 31 and each of the primary storage control devices 10 can be connected directly, or can be connected via fibre channel switches or other relay devices.

Each management terminal 41 manages the state of the respective connected primary storage control device 10, and is provided to specify configuration modifications. Each primary storage control device 10 is connected to the management network CN14 via a management terminal 41. The management network CN14 is configured as a network such as for example a LAN (Local Area Network) or a WAN. The primary storage control devices 10 can also be connected directly to the management network CN14, without an intervening management terminal 41.

Similarly to the primary site Ps, in the secondary site Ss also the secondary host 32 is connected to each of the secondary storage control devices 20 via a SAN or other data input/output paths CN11. Each secondary storage control device 20 is connected, via a management terminal 42, to the management network CN14. The secondary storage control devices 20 are also connected to each other via fibre channel or other update control paths CN13.

The network configuration between the sites Ps and Ss is explained. The sites Ps and Ss are connected via the management network CN14. Each primary storage control device 10 and each secondary storage control device 20 are connected via a SAN or other remote copy paths CN12. The primary volume 530A within each primary storage control device 10 and the secondary volume 530B within each secondary storage control device 20 respectively establish a remote copy pair.

Although explained in detail below, the stored contents of a primary volume 530A are also stored in the secondary volume 530B establishing a copy pair as a result of initial copying. When the data of the primary volume 530A is updated, information relating to this data update is also transferred to the secondary volume 530B. By updating the stored contents of the secondary volume 530B, the stored contents are made coincident with the stored contents of the primary volume 530A.

Because the timing of processing by a primary storage control device 10 of a write request from a primary host 31 is not strictly synchronized with the timing of initiation of remote copying in response to this write request, there are few periods in which the stored contents of the primary volume 530A and of the secondary volume 530B are completely coincident. However, after some amount of time delay, data updates to the primary volume 530A are also reflected in the secondary volume 530B. Hence after the primary host 31 halts the issuing of write requests, with the passage of time, the stored contents of the primary volume 530A and of the secondary volume 530B in due course are made to coincide.

The secondary site Ss may be provided solely for the purpose of backing up the primary site, or can be used to perform task processing specific to the secondary site. That is, the secondary host 32 can also use another volume not used in remote copying to perform separate task processing. In this case, a configuration may be adopted in which task processing executed uniquely by the secondary site Ss is backed up by the primary site Ps.

One prescribed storage control device 20 among the plurality of secondary storage control devices 20 provided at the secondary site Ss is used as a master secondary storage control device 20(M). This master secondary storage control device 20(M) manages in a unified manner the state of progress of remote copying of all the secondary storage control devices 20 related to remote copying.

The management server 43 is connected to the primary host 31 and secondary host 32, and to each of the primary storage control devices 10 and each of the secondary storage control devices 20, via the management network CN14. The management server 43 manages the states of each of the hosts 31, 32 and each of the storage control devices 10, 20.

The primary storage control devices 10 and secondary storage control devices 20 need not be connected one-to-one; a configuration may be employed in which N primary storage control devices 10 are connected to M secondary storage control devices 20. That is, as explained below, it is sufficient that logical volumes correspond between the copy source (source side) and the copy destination (destination side) of remote copying; it is not necessary that the numbers of volumes 530A and 530B provided in each of the storage control devices 10, 20 be the same.

Further, a configuration may be employed in which the secondary host 32 and the primary storage control devices 10 are connected by a separate data input/output network. In the case of such a configuration, when a fault occurs in the primary host 31, the secondary host 32 could directly access primary volumes 530A and take over processing which was being performed by the primary host 31.

Figure 3:
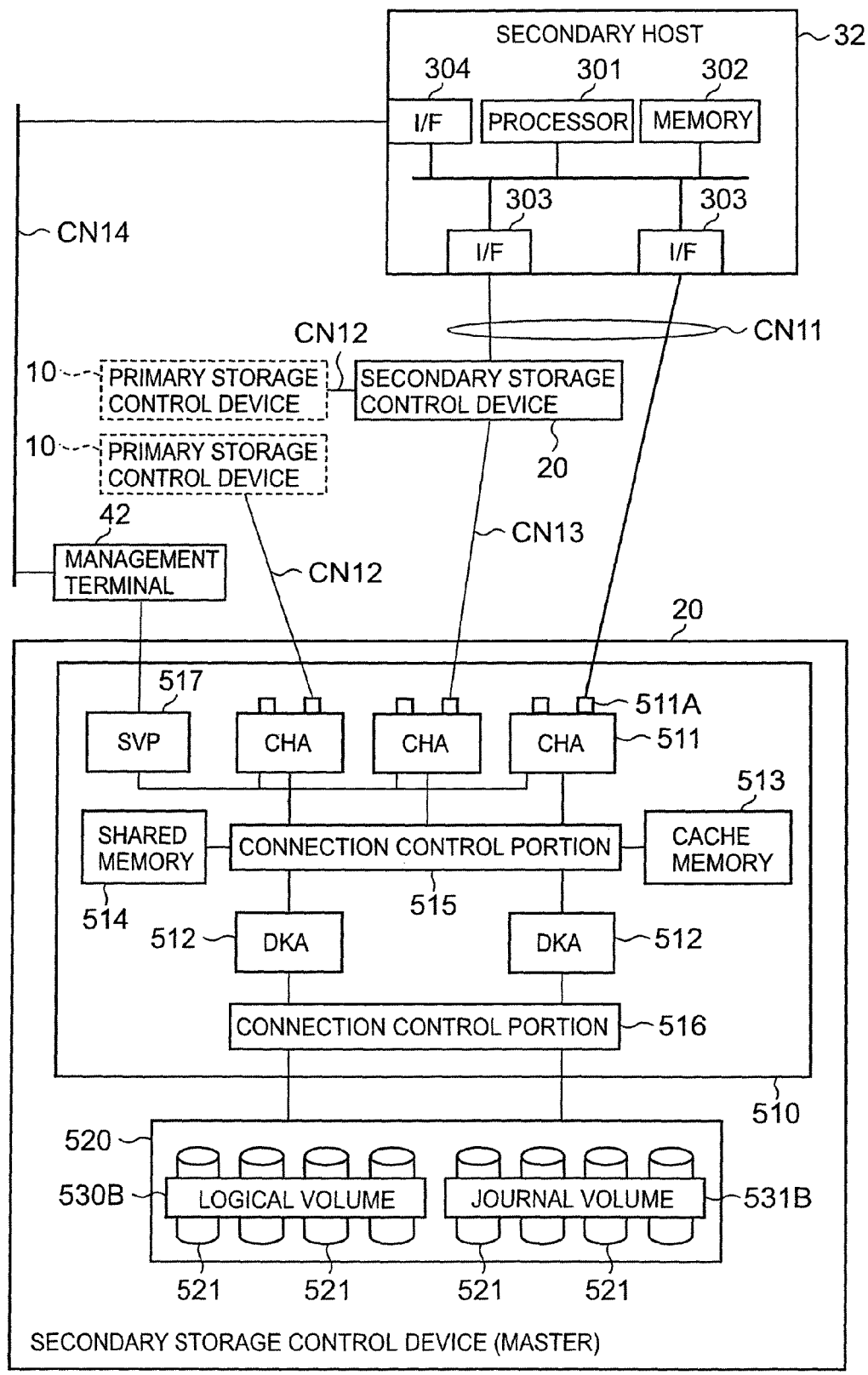
FIG. 3 is an explanatory diagram showing the hardware configuration of a host and storage control device.

FIG. 3 is an explanatory diagram showing a portion of the hardware configuration of a storage system. In FIG. 3, a portion of the configuration of a secondary site Ss is shown. The secondary site Ss and primary site Ps can have the same hardware configuration, and so an explanation of the primary site Ps is omitted.

The secondary host 32 is for example a computer device such as a server machine or a mainframe. The secondary host 32 can comprise, for example, a processor 301, memory 302, data input/output interface (hereafter "I/F") 303, and management I/F 304.

The processor 301 realizes prescribed functions by reading and executing various programs stored in memory 302. Such various programs may be a management portion 312, explained below in conjunction with FIG. 4, an OS (Operating System) 322, and an application program (APP) 332.

The secondary host 32 is connected to each of the secondary storage control devices 20 from each data input/output I/F 303, via the data input/output paths CN11. The management I/Fs 304 are connected to the management network CN14.

The hardware configuration of a secondary storage control device 20 is explained. A secondary storage control device 20 can be broadly divided into a controller 510 and a storage portion 520. The controller 510 and storage portion 520 may be provided in the same housing, or may be provided in separate housings.

The controller 510 controls operation of the secondary storage control device 20. The controller 510 can comprise, for example, a plurality of channel adapters (hereafter "CHAs") 511, a plurality of disk adapters (hereafter "DKAs") 512, cache memory 513, shared memory 514, connection control portions 515 and 516, and a SVP 517.

The CHAs 511 control the transfer of data between the secondary host 32 and storage control devices 10, 20, and comprise a plurality of communication ports 511A. In the example shown in FIG. 3, one CHA 511 is used for communication with the secondary host 32. Another CHA 511 is connected for communication with a secondary storage control device 20. Still another CHA 511 is used for communication with a primary storage control device 10. As explained above, in place of CHAs 511, secondary storage control devices 20 may be connected by a LAN I/F instead.

Each DKA 512 controls data communication with disk drives 521. The DKAs 512 are connected to disk drives 521 via connection control portions 516, and perform data transfer in block units according to the fibre channel protocol.

DKAs 512 monitor the states of disk drives 521 as necessary, and the monitoring result is transmitted to the SVP 517 via the internal network. The CHAs 511 and DKAs 512 can be configured as separate control circuit boards, or CHA functions and DKA functions can be provided on a single control circuit board. The disk drives 521 and DKAs 512 are connected via a plurality of communication paths. Even when a fault occurs in any one communication paths, each DKA 512 can access each of the disk drives 521 via another communication path. Further, even when a fault occurs in any of the DKAs 512, each of the disk drives 521 can be accessed via the normally functioning DKAs 512.

The cache memory 513 stores write data transferred from a primary storage control device 10 and write data and similar received from the secondary host 32. The cache memory 513 can for example be configured from nonvolatile memory, but can also be configured from volatile memory. When cache memory 513 is formed from volatile memory, batteries are used to back up the cache memory 513.

Shared memory (or control memory) 514 stores various control information, management information and similar for use in controlling operation of the secondary storage control device 20. The shared memory 514 can for example be configured from nonvolatile memory. Control information and similar can be managed redundantly by a plurality of shared memory units 514.

The cache memory 513 and shared memory 514 can be configured on separate memory circuit boards; or, cache memory 513 and shared memory 514 can be mounted on a single memory circuit board. A portion of the cache memory can be used as a control area to store control information, with the remaining portion used as a cache area to store data.

The connection control portion 515 connects the CHAs 511, DKAs 512, cache memory 513, and shared memory 514. All of the CHAs 511 and DKAs 512 can access both cache memory 513 and shared memory 514 via the connection control portion 515. The connection control portion 515 is for example configured as a crossbar switch or similar.

The SVP 517 is connected to each of the CHAs 511 via for example a LAN or other internal network. The SVP 517 can acquire the states of each of the CHAs 511 and each of the DKAs 512, as well as the state of use and similar of cache memory 513. The SVP 517 is connected via the management terminal 42 to the management network CN14.

As described above, the controller 510 can be configured by mounting a plurality of types of boards (CHAs 511, DKAs 512, and similar) in a controller housing. Other configurations are possible, and a configuration may be employed in which the above-described functions (functions for communication with the secondary host 32, functions for communication with disk drives 521, data processing functions, and similar) are mounted on a single control board. In this case, it is preferable from the standpoint of enhanced reliability that a plurality of control boards be provided in a redundant configuration.

The configuration of the storage portion 520 is explained. The storage portion 520 comprises a plurality of disk drives 521. Disk drives 521 can for example be hard disk drives, semiconductor memory drives, optical disc drives, magneto-optical disc drives, magnetic tape drives, or various other storage devices. When using hard disk drives, various types of hard disk drives can be used, such as for example FC (Fibre Channel) disks, SATA (Serial AT Attachment) disks, and SCSI (Small Computer System Interface) disks. Also, different types of storage devices can coexist within the storage portion 520.

Although differing depending on the RAID level, a prescribed number of disk drives 521 can be used to configure a RAID group (parity group). For example, three data disks and one parity disk can be used in a RAID 5 configuration (3D+1P).

A RAID group is a physical storage area with redundancy, and can also be called a physical storage device. One or a plurality of logical volumes 530B, which are logical storage devices, can be set in the physical storage area provided by a RAID group. In the following explanation, a logical volume may be abbreviated by LU (for Logical Unit). Journal volumes 531B are configured as logical storage devices similar to logical volumes 530B. A journal volume 531B can store write data and similar transferred from a primary storage control device 10.

The primary host 31 and primary storage control devices 10 can have a hardware configuration similar to those of the primary host 32 and secondary storage control devices 20, and so an explanation is omitted. However, the primary host 31 and secondary host 32, and the primary storage control devices 10 and secondary storage control devices 20, need not necessarily have the same hardware configuration. For example, the most recent storage control devices may be used as primary storage control devices 10, while older storage control devices may be used as secondary storage control devices 20, and in other ways also the physical configurations may be different between the primary site Ps and secondary site Ss.

The journal volumes 531A of the primary storage control devices 10 can be used to accumulate untransferred data when transfer between the primary storage control devices 10 and secondary storage control devices 20 is temporarily not possible due to a link fault (path fault) or similar. In this case, after recovery from the link fault, the untransferred data accumulated in a journal volume 531A is transferred to the secondary storage control devices 20. By thus using journal volumes 531A on the primary side, tolerance of link faults can be improved.

Figure 4:
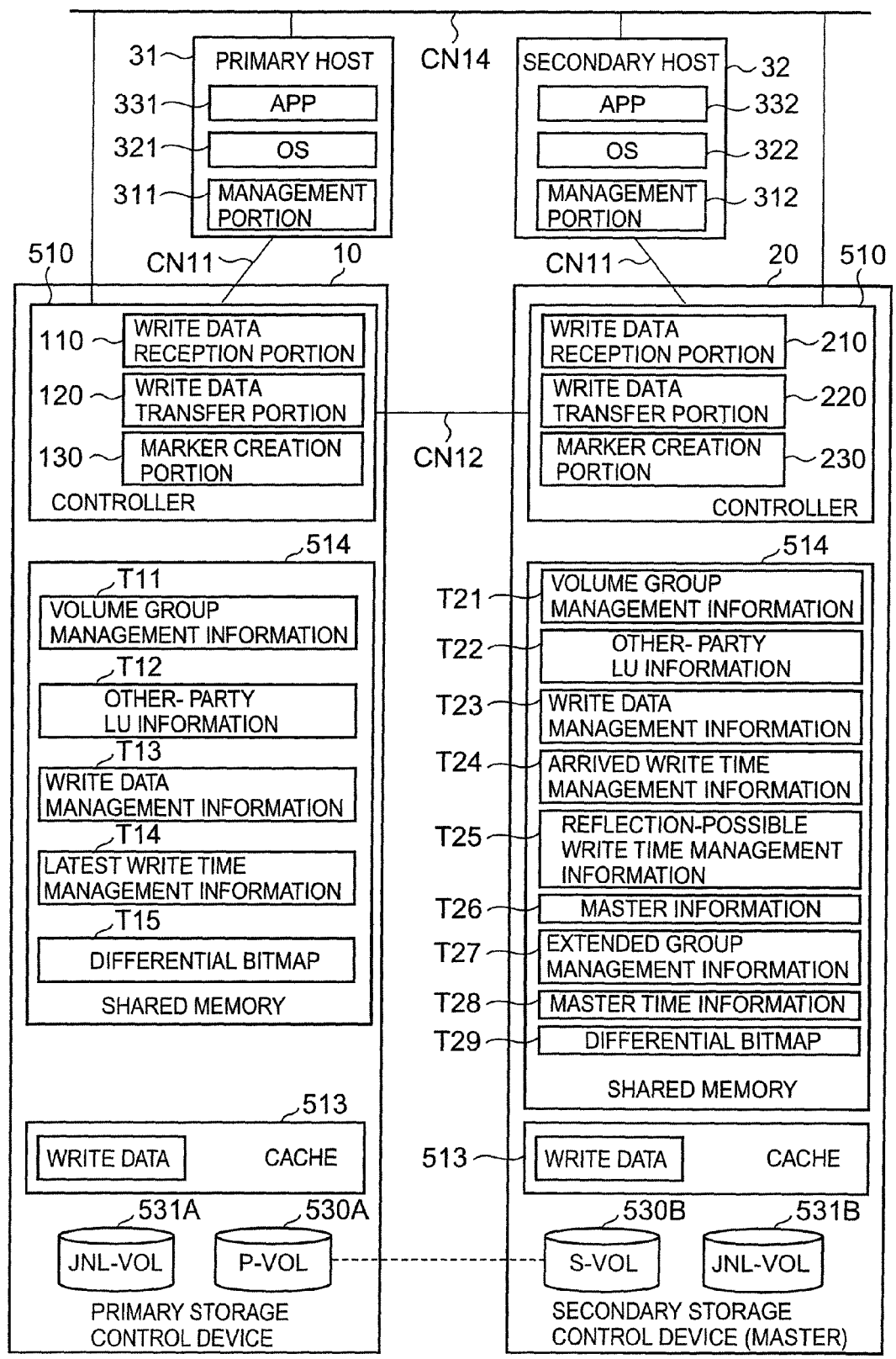
FIG. 4 is an explanatory diagram showing the software configuration of hosts and storage control devices.

FIG. 4 is an explanatory diagram showing the software configuration of a storage system. The primary host 31 is a computer device used in normal operation, and the secondary host 32 is a computer device which is in standby mode in preparation for occurrence of faults or similar. On the primary host 31, for example, a management portion 311, OS 312, and application program (abbreviated "APP" in the FIG. 331 are each running. Similarly on the secondary host 32, a management portion 312, OS 322, and application program 332 are each running. The application programs 331, 332 comprise for example database management system (DBMS) or other software. The management portions 311, 312 performs processing to register volumes in remote groups, issue instructions for suspend processing, and similar, as explained below.

The controller 510 of a primary storage control device 10 realizes a write data reception portion 110, write data transfer portion 120, and marker creation portion 130. The write data reception portion 110 functions to receive write requests and write data transmitted from the primary host 31. The write data transfer portion 120 functions to transfer write data and similar to a secondary storage control device 20 which is a copy destination. The marker creation portion 130 functions to transmit control information to control suspend processing to a secondary storage control device 20. Each of these functions 110, 120, 130 is realized by for example having a processor in a CHA 511 read and execute a prescribed program.

The shared memory 514 in a primary storage control device 10 can for example store volume group management information T11, other-side volume information T12, write data management information T13, latest write time management information T14, and a differential bitmap T15. These types of control information are explained below.

The cache memory 513 in a primary storage control device 10 stores write data received from the primary host 31. A journal volume 531A may be used as a device for storing write data. By storing write data in a journal volume 531A, the rate of use of cache memory 531 can be lowered, and a large amount of write data can be stored. The size of the journal volume 531A may be set to a fixed value in advance, or may be set from time to time as necessary.

The configuration of a secondary storage control device 20 is explained. The controller 510 of the secondary storage control device 20 realizes a write data reception portion 210, write data reflection portion 220, and master processing portion 230. The write data reception portion 210 functions to receive write data and similar transmitted from a primary storage control device 10. The write data reflection portion 220 functions to write, in order, the write data received from a primary storage control device 10 to a secondary volume 530B.

The master processing portion 230 operates in one secondary storage control device 20 among the plurality of secondary storage control devices 20. The master processing portion 230 functions to control operation of the write data reflection portions 220 in each secondary storage control device 20 performing remote copying. The master processing portion 230 can issue prescribed instructions to the write data reflection portions 220 in other secondary storage control devices 20, via the update control paths CN13. A configuration may also be employed in which master processing portions 230 are installed in advance in each of the secondary storage control devices 20, but only one of the master processing portions 230 is started.

The shared memory 514 in a secondary storage control device 20 stores, for example, volume group management information T21, other-party volume information T22, write data management information T23, arrived write time management information T24, reflection-possible write time management information T25, master information T26, extended group management information T27, master time information T28, and a differential bitmap T29.

The differential bitmaps T29 and T15 are used to manage the update states of volumes 530B and 530A respectively. For example, the differential bitmaps T29 and T15 are configured as rows of bit data corresponding to each of the blocks of a volume; a bit for an updated block is set to "1" as an update flag. Hence by using the differential bitmaps T29 and T15, it is possible to judge which areas of a volume have been updated.

Here, in the storage system of this embodiment the primary volumes 530A and secondary volumes 530B are each grouped, so that remote copying can be performed in group units. The user can determine which volumes are in a group as appropriate. Group settings are set using, for example, the hosts 31, 32, or the management terminals 41 and 42 or the management server 43.

Figure 5:
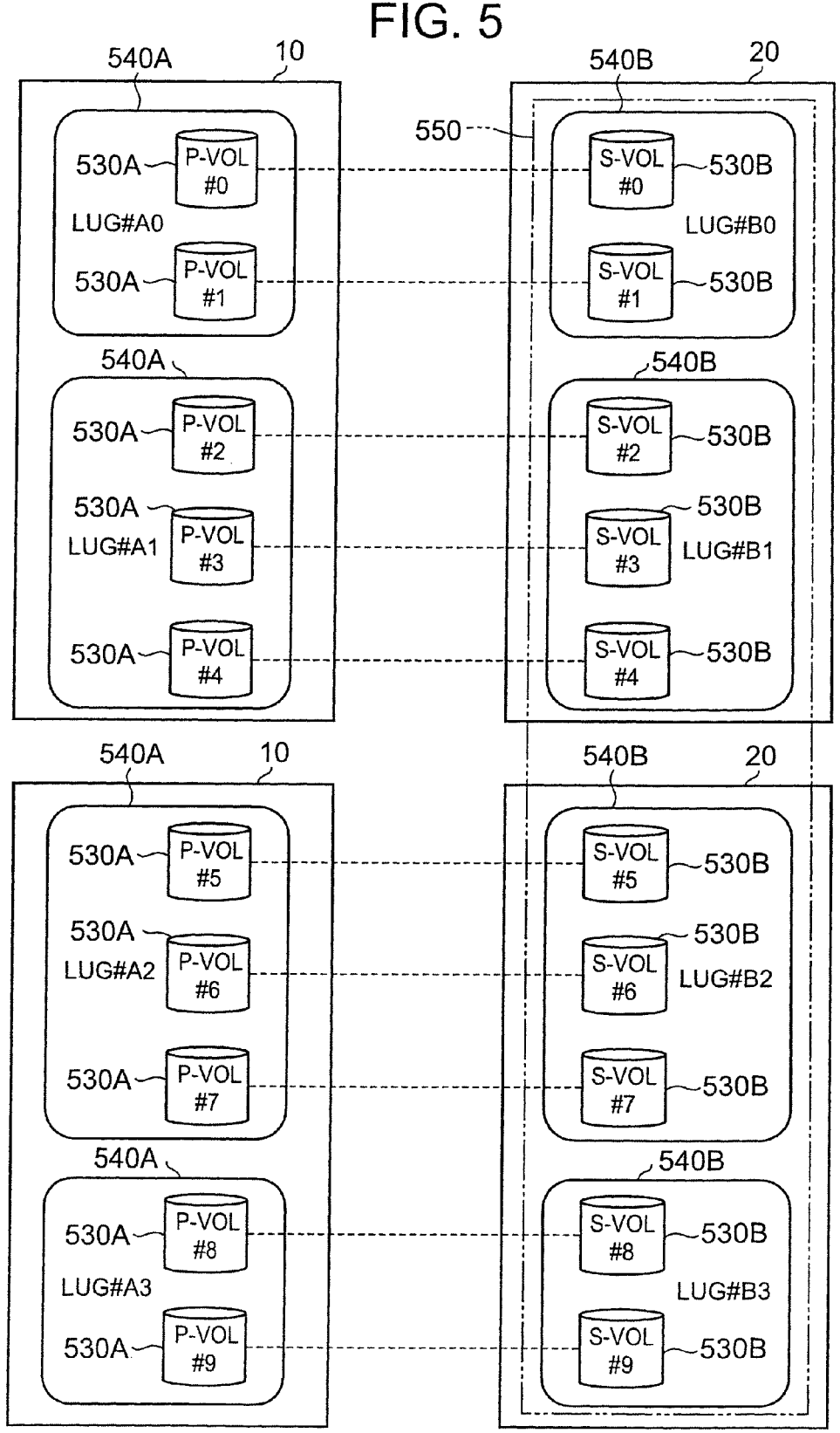
FIG. 5 is an explanatory diagram schematically showing the manner in which a plurality of logical volumes are grouped and remote copying is performed.

FIG. 5 is an explanatory diagram showing a concept of a logical volume group. In this embodiment, the relation between the volumes 530A and 530B is used to define groups. In FIG. 5, volumes 530A and 530B which establish remote copy pairs are connected by dashed lines. Primary volumes 530A are copy sources, and secondary volumes 530B are copy destinations.

A volume group 540A is formed from one or a plurality of primary volumes 530A. Similarly, a volume group 540B is formed from one or a plurality of secondary volumes 530B. A source-side volume group (primary volume group) 540A and destination-side volume group (secondary volume group) 540B are associated, and remote copying is performed between the volumes 530A and 530B comprised by each of the groups 540A, 540B. As explained below, remote copy reflection processing is controlled in units of secondary volume groups 540B.

Computer resources required to perform write data transfer, processing for writing of write data to volumes 530B (reflection processing) and similar, are allocated for each of the volume groups 540A, 540B.

If remote copying were managed for each of the volumes 530A and 530B, with sources allocated separately, there would be numerous objects for management, and management tasks would become complicated. And, because of the numerous objects for processing, there may be an increase in the resources required for processing, resulting in increased loads on the storage control devices 10, 20.

On the other hand, if entire primary storage control devices 10 and secondary storage control devices 20 were used as units for management, management according to the special properties of each volume 530A, 530B would be difficult. The performance required of volumes 530A, 530B differs according to the type of application program 331 and the type of task processing.

For example, a certain application program 331 may require a volume having higher performance and higher reliability, while another application program 331 may require a low-cost volume. Hence it is preferable that the volumes 530A, 530B be grouped according to their special properties (for example, the type of disk drive 521, volume size, and similar), and that remote copying be managed by volume group 540A, 540B.

Hence by managing volumes in groups as in this embodiment, a user can set the remote copy configuration and conditions by volume group 540A, 540B, for improved convenience.

Further, in this embodiment an arbitrary secondary volume group 540B can be selected from among the secondary volume groups 540B to configure an extended group 550. The extended group 550 can be configured spanning housings. That is, a single extended group 550 can be configured from a secondary volume group 540B within one secondary storage control device 20 and a secondary volume group 540B within another secondary storage control device 20. In FIG. 5, a single extended group 550 is shown, but the user can set a plurality of extended groups 550.

Each of the secondary volumes 540B belonging to an extended group 550 is controlled such that the state of progress of remote copying is synchronized, even when the volumes exist in different secondary storage control devices 20. That is, as explained below, in a state in which remote copying is halted (a suspend state), reflection of write data is performed up to a prescribed time (reflection-possible write time) among the plurality of secondary volume groups 540B belonging to the extended group 550, to maintain data consistency.

Figure 6:
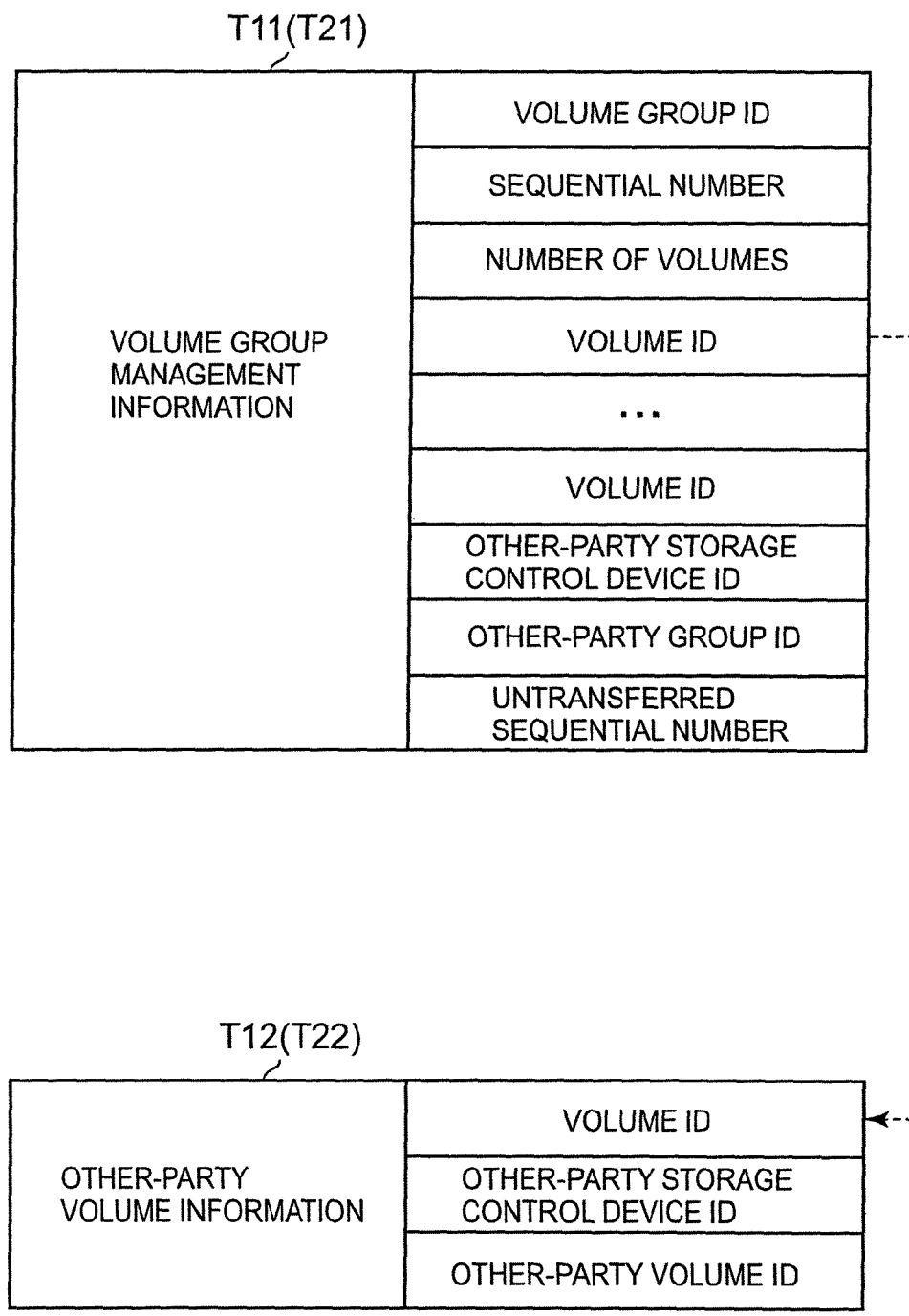
FIG. 6 is an explanatory diagram showing the configuration of volume group management information and other-side volume information.

Next, the various types of information used to control remote copying are explained. First, FIG. 6 is an explanatory diagram showing one example of volume group management information T11 (T12) and other-party volume information T12 (T22).

Volume group management information T11 (T21) is information used to manage the volume groups 540A, 540B shown in FIG. 5. Volume group management information T11 stored in the primary storage control devices 10 manages the configuration of primary volume groups 540A provided on the side of a primary storage control device 10. Volume group management information T21 stored in the secondary storage control devices 20 manages the configuration of secondary volume groups 540B provided on the side of a secondary storage control device 20.

Both of the volume group management information types T11 and T21 have the same structure. Hence in the following, the volume group management information T11 is mainly explained. However, while the structure itself is common to such information types, the values set in each field may differ.

The volume group management information T11 comprises in association, for example, a volume group ID, sequential numbers, number of volumes, volume IDs, other-party storage control device ID, other-party group ID, and untransferred sequential number.

The volume group ID is identification information to specify the volume group. In the primary-side volume group management information T11, the volume group ID is set to identification information to specify the primary volume group 540A. In secondary-side volume group management information T21, the volume group ID is set to identification information to specify the secondary volume group 540B.

The sequential numbers are information to manage the order of issue and number of issues of write data to volumes belonging to the volume group specified by the volume group ID. Sequential numbers are provided consecutively for write data for the volumes. If the initial value is "0", then each time write data is issued once, the sequential number is incremented by one.

The number of volumes is information indicating the total number of volumes belonging to the volume group specified by the volume group ID.

Volume IDs are information which uniquely specify one or a plurality of volumes belonging to the volume group specified by the volume group ID. The volume IDs of all the volumes belonging to the volume group are registered in the volume group management information T11.

The other-party storage control device ID is identification information to specify the storage control device having an other-party volume group which establishes a remote copy pair with the volume group specified by the volume group ID. As the other-party storage control device ID, for example, a serial number or similar set in advance for each storage control device can be used. In the primary-side volume group management information T11, the serial number of a secondary storage control device 20 can be set as the other-side storage control device ID. In the secondary-side volume group management information T21, the serial number of a primary storage control device 10 is set.

The other-side group ID is identification information to specify the volume group which establishes a remote copy pair with the volume group specified by the volume group ID. In the primary-side volume group management information T11, identification information to specify a secondary volume group 540B is set as the other-side group ID. In the secondary-side volume group management information T21, identification information to specify a primary volume group 540A is set as the other-side group ID.

The untransferred sequential number is information used in write data transfer processing, described below, and indicates the smallest sequential number of write data for which transfer is required. An untransferred sequential number is used only by a primary storage control device 10, and is not used by a secondary storage control device 20. Hence an untransferred sequential number is not used in the volume group management information T21.

In the lower part of FIG. 6, other-side volume information T12 (T22) is shown. The other-side volume information T12 used by a primary storage control device 10 (primary-side other-side volume information) and the other-side volume information T22 used by a secondary storage control device 20 (secondary-side other-side volume information) have the same structure. Hence an explanation is given mainly of primary-side other-side volume information T12.

A remote copy pair relationship is defined in the other-side volume information T12. The other-side volume information T12 comprises in association, for example, a volume ID, an other-side storage control device ID, and an other-side volume ID.

The volume ID is set to information to specify the primary volume 530A which is the copy source. The other-side storage control device ID is set to information to specify the secondary storage control device 20 having the secondary volume 530B which establishes a copy pair with the primary volume 530A specified by the volume ID.

The other-side volume ID is set to information to specify the secondary volume 530B which establishes a copy pair with the primary volume 530A specified by the volume ID.

In the case of secondary-side other-side volume information T22, information to specify a secondary volume 530B is set in the volume ID, information to specify a primary storage control device 10 is set in the other-side storage control device ID, and information to specify a primary volume 530A is set in the other-side volume ID.

Figure 7:
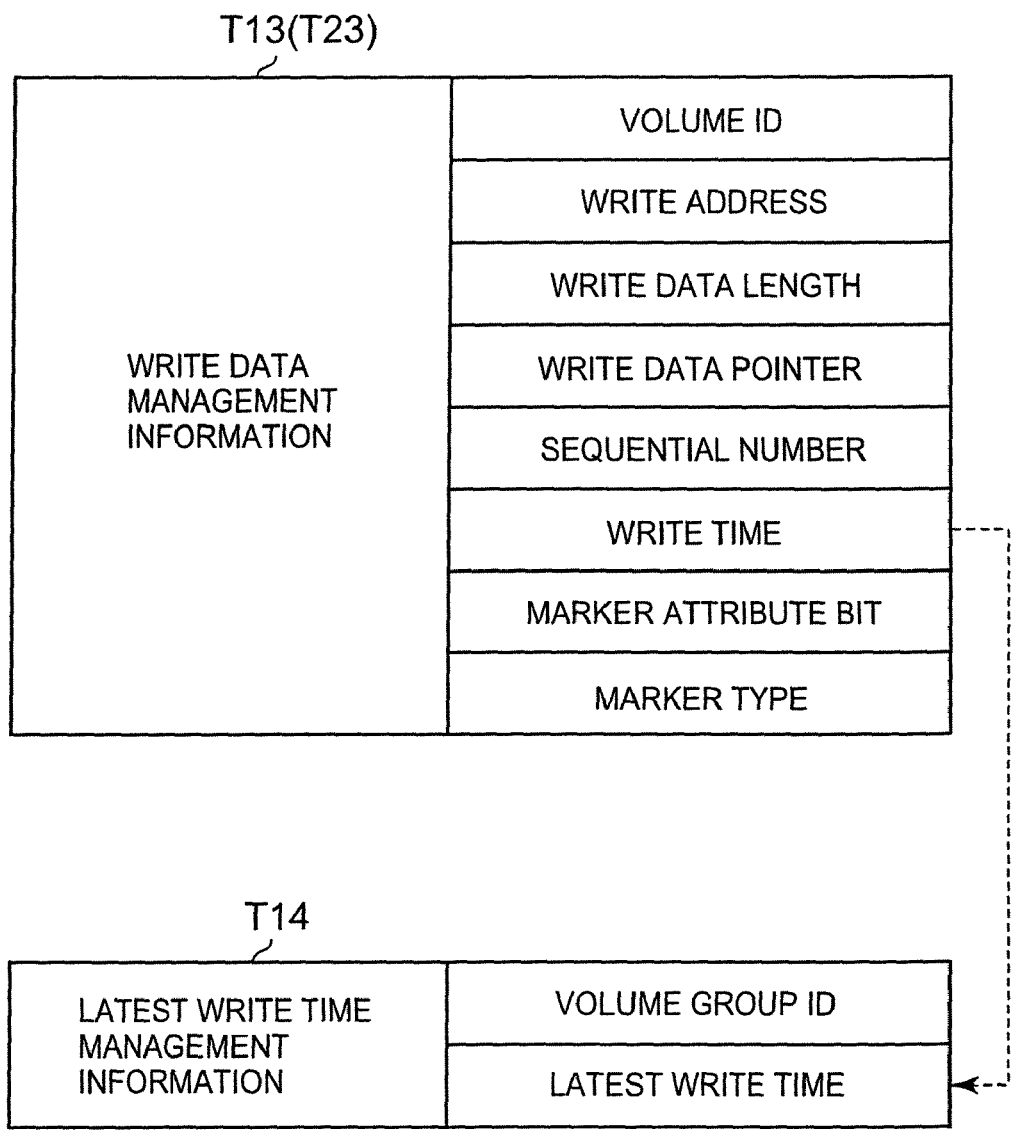
FIG. 7 is an explanatory diagram showing the configuration of write data management information and latest write time management information.

FIG. 7 shows write data management information T13 (T23) and latest write time management information T14. The primary-side write data management information T13 and secondary-side write data management information T23 have the same structure. Hence the primary-side write data management information T13 is primarily explained.

Write data management information T13 is information to manage write data written to a primary volume 530A which is a copy source. Write data management information T13 is for example created and managed in list form for each primary volume group 540A.

One write data management information item T13 comprises in association, for example, a volume ID, write address, write data length, write data pointer, sequential number, write time, marker attribute bits, and marker type.

Information to specify a primary volume 530A is set in the volume ID. The write address indicates the leading address for writing of write data in the specified primary volume. The write data length is the size of the write data. The write data pointer is the leading address of the write data stored in cache memory 513.

The primary storage control device 10 notifies the primary host 31 of write completion at the time that the write data received from the primary host 31 is stored in cache memory 513. Thereafter, the primary storage control device 10 writes the write data stored in cache memory 513 to a primary volume 530A with appropriate timing. Hence the write data is first stored in cache memory 513, and then stored in a primary volume 530A. For this reason, the write data management information T13 comprises a write data pointer.

The status of the write data prior to writing to the primary volume 530A is "dirty". The status of the write data after writing to the primary volume 530A is "clean". When the write data in cache memory 513 changes to clean status, the cache area to which the write data has been stored can be reused to store other write data.

Sequential number is a number assigned consecutively to write data written to all the primary volumes 530A belonging to the volume group to which the primary volume 530A specified by the volume ID belongs. The write time is the time of the write request by the primary host 31 for the write data. That is, the write time is the time at which the primary host 31 issues the write request for the specified primary volume 530A.

The marker attribute bits are information used to identify whether write data is special write data to control remote copying (hereafter, this control write data is called a "marker"), or ordinary write data. While details are explained below, in the case of normal write data, the marker attribute bit is set to "0". In the case of a marker, the marker attribute bit is set to "1".

The marker type is information specifying the marker type. Details are explained below; marker types may be, for example, "flush suspend", "purge suspend", "swap suspend", or similar.

In the bottom of FIG. 7, the latest write time management information T14 is shown. The latest write time management information T14 is used to manage the latest write data write time for which writing to the primary volume 530A is requested in remote copying. Hence latest write time management information T14 is used for each primary volume 530A. The latest write time management information T14 comprises in association, for example, a group ID to specify the primary volume group 540A, and a latest write time.

Figure 8:
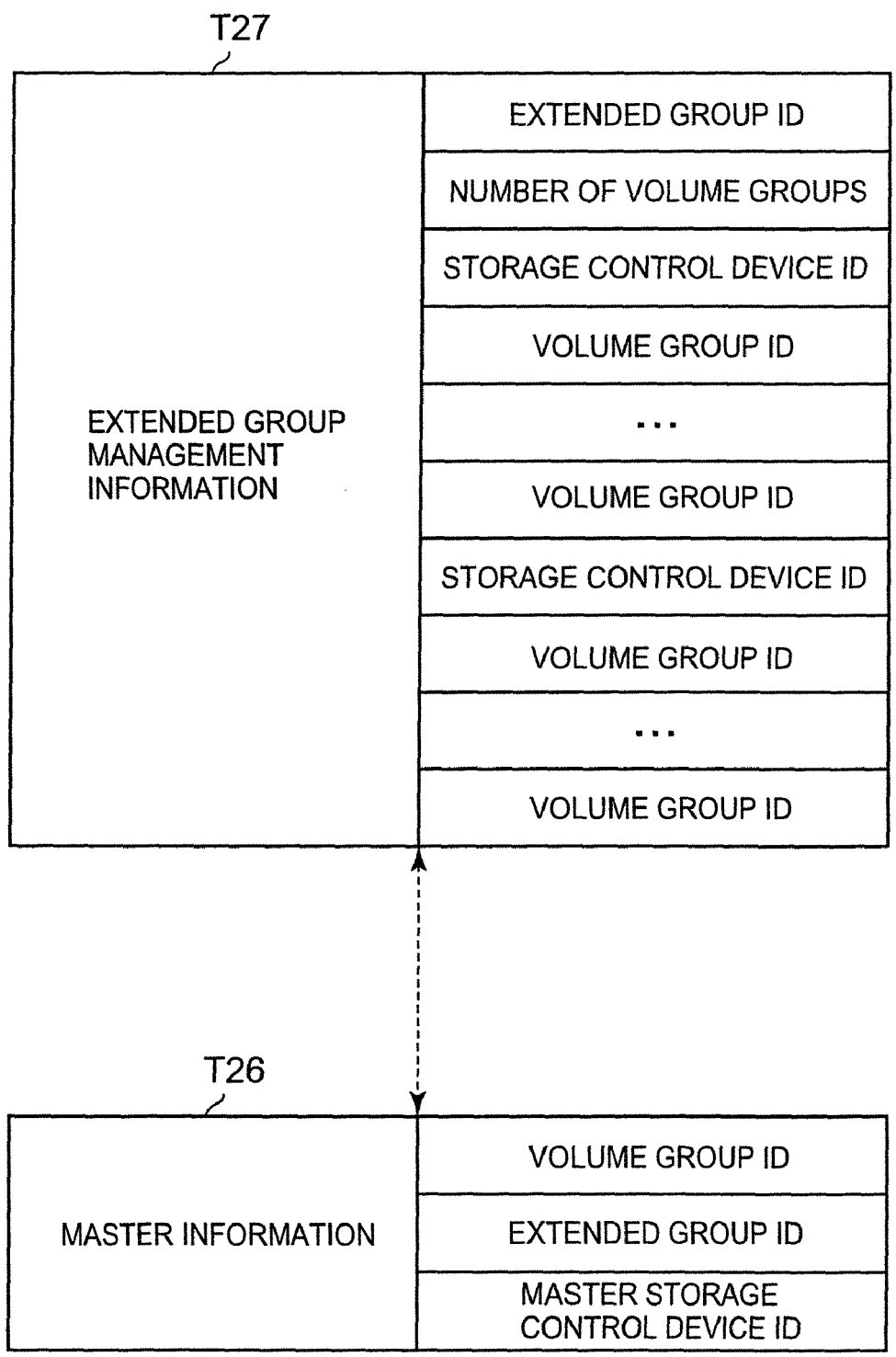
FIG. 8 is an explanatory diagram showing the configuration of extended group management information and master information.

FIG. 8 shows extended group management information T27 and master information T26. First the extended group management information T27 is explained. Extended group management information T27 is information to manage an extended group 550, which can be established spanning a plurality of secondary storage control devices 20. Extended group management information T27 is prepared for each extended group 550.

Extended group management information T27 comprises in association, for example, an extended group ID, the number of volume groups, storage control device IDs, and volume group IDs.

The extended group ID is identification information to specify the extended group 550. The number of volume groups indicates the number of secondary volume groups 540B comprised by the specified extended group 550. The storage control device IDs are identification information to specify the secondary storage control devices 20 in which the secondary volume groups 540B comprised by the extended group 550 exist. Volume group IDs are identification information specifying the secondary volume groups 540B comprised by the extended group 550.

Master information T26 is shown in the lower part of FIG. 8. Master information T26 is information to specify the master processing portion 230. As explained below, the master processing portion 230 issues prescribed instructions to each secondary storage control device 20 regarding remote copy synchronization. Hence each secondary storage control device 20 holds master information T26, as information indicating the origin of prescribed instructions to be received.

Master information T26 comprises in association, for example, a volume group ID, extended group ID, and master storage control device ID. The volume group ID is identification information to specify a secondary volume group 540B. The extended group ID is identification information to specify the extended group 550 to which the specified secondary volume group 540B belongs. The master storage control device ID is identification information to specify the secondary storage control device 20 having the master processing portion 230 to issue prescribed instructions for the specified secondary volume group 540B.

In this embodiment, the state of progress of remote copying in each secondary storage control device 20 is arbitrated by a single master processing portion 230. Instead, however, a configuration may be employed in which master processing portions 230 are provided in different secondary storage control devices 20, and each master processing portion 230 is in charge of a different extended group 550.

Figure 9:
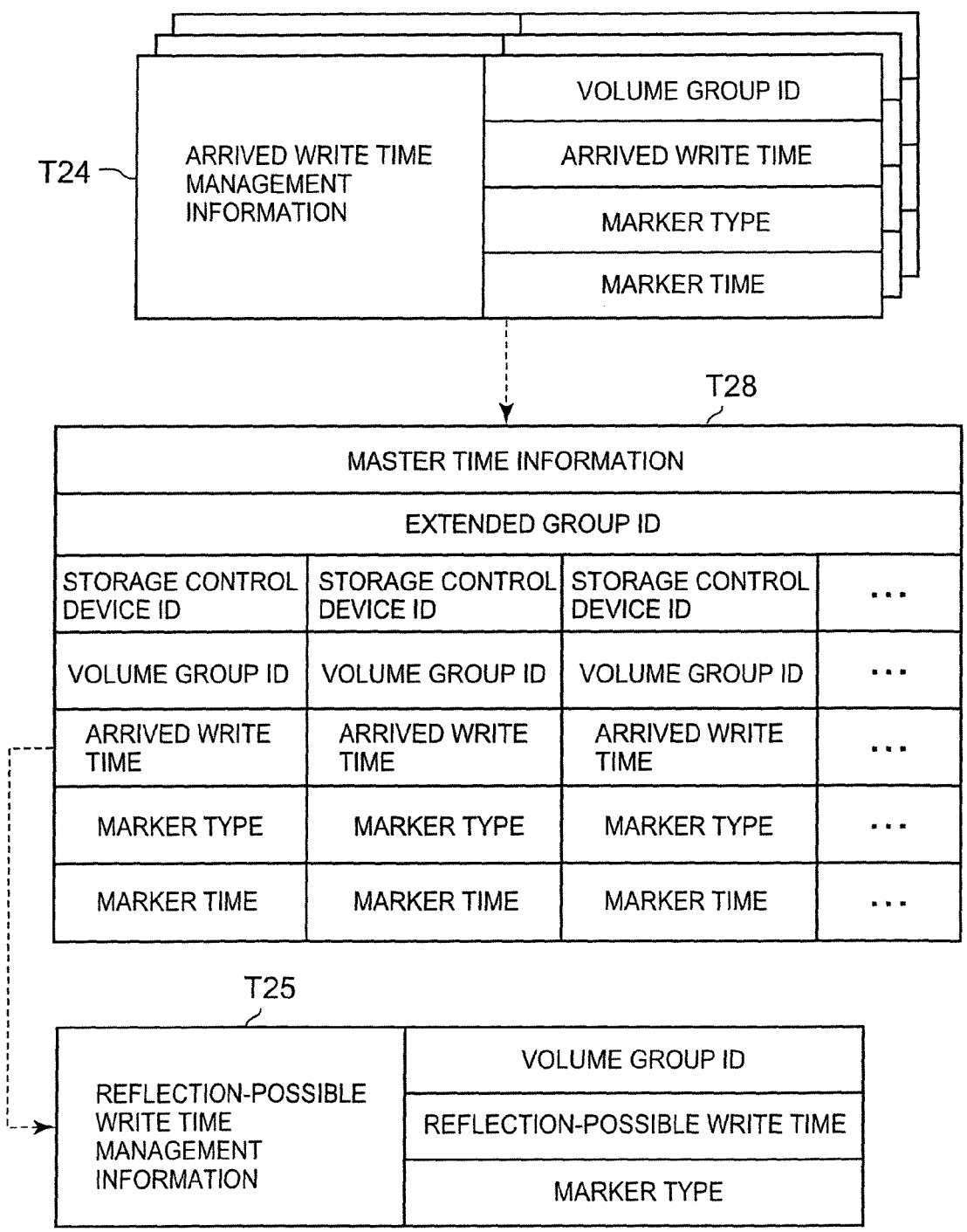
FIG. 9 is an explanatory diagram showing the configuration of arrived write time management information, master time information, and reflection-possible write time management information.

FIG. 9 shows arrived write time management information T24, master time information T28, and reflection-possible write time management information T25.

Arrived write time management information T24 is information used to manage write times for the latest write data which has arrived at a secondary storage control device 20. Arrived write time management information T24 comprises in association, for example, a volume group ID, arrived write time, marker type, and marker time.

The volume group ID is identification information to specify the secondary volume group 540B. The arrived write time records the write time of the latest write data, among write data which has arrived for the specified secondary volume group 540B. The initial value of the arrived write time is "0". The marker type is information indicating the type of marker detected by the write data reception portion 210; the initial value is an invalid value. The marker time is the time at which a marker is assigned; the initial value is "0".

The master time information T28 is information used by the master processing portion 230. The master time information T28 comprises in association, for example, an extended group ID, storage control device IDs, volume group IDs, an arrived write time, a marker type, and a marker time.

The extended group ID is identification information to specify the extended group 550. The storage control device IDs are identification information to specify the secondary storage control devices 20 having secondary volume groups 540B belonging to the specified extended group 550. The volume group ID is identification information to specify the secondary volume group 540B belonging to the specified extended group 550. The arrived write time indicates the write time of the latest write data, among the write data which has arrived for the secondary volume groups 540B. The initial value of the arrived write time is "0". Each secondary storage control device 20 notifies the master processing portion 230 of the write times of the latest write data arriving at secondary volume groups 540B. The marker type is information indicating the type of marker; the initial value is an invalid value. The marker time is the time the marker is assigned; the initial value is "0".

The reflection-possible write time management information T25 is information used to manage, for each secondary volume group 540B, reflection-possible write times. The reflection-possible write time is information specifying the range of write data which can be reflected in each secondary volume 530B belonging to the secondary volume group 540B. A reflection-possible write time corresponds to an "update-possible time".

Write data can be written, in order, to the secondary volumes 530B up to the time indicated as the reflection-possible write time. Consider an example in which there are four write data with write times, N1, N2, N3 and N4. Here the write time N4 is the most recent write time. If the master processing portion 230 has selected N3 as the reflection-possible write time, then the write data reflection portion 220 writes the write data with write time N1 to the secondary volume 530B, then writes the write data with write time N2, and finally writes the write data with write time N3 to the secondary volume 530B.

The reflection-possible write time management information T25 comprises in association, for example, volume group IDs, reflection-possible write times, and marker types. A volume group ID is identification information to specify a secondary volume group 540B. A reflection-possible write time is as described above, and has an initial value of "0". The marker type indicates the type of marker, and has as an initial value an invalid value.

Figure 10:
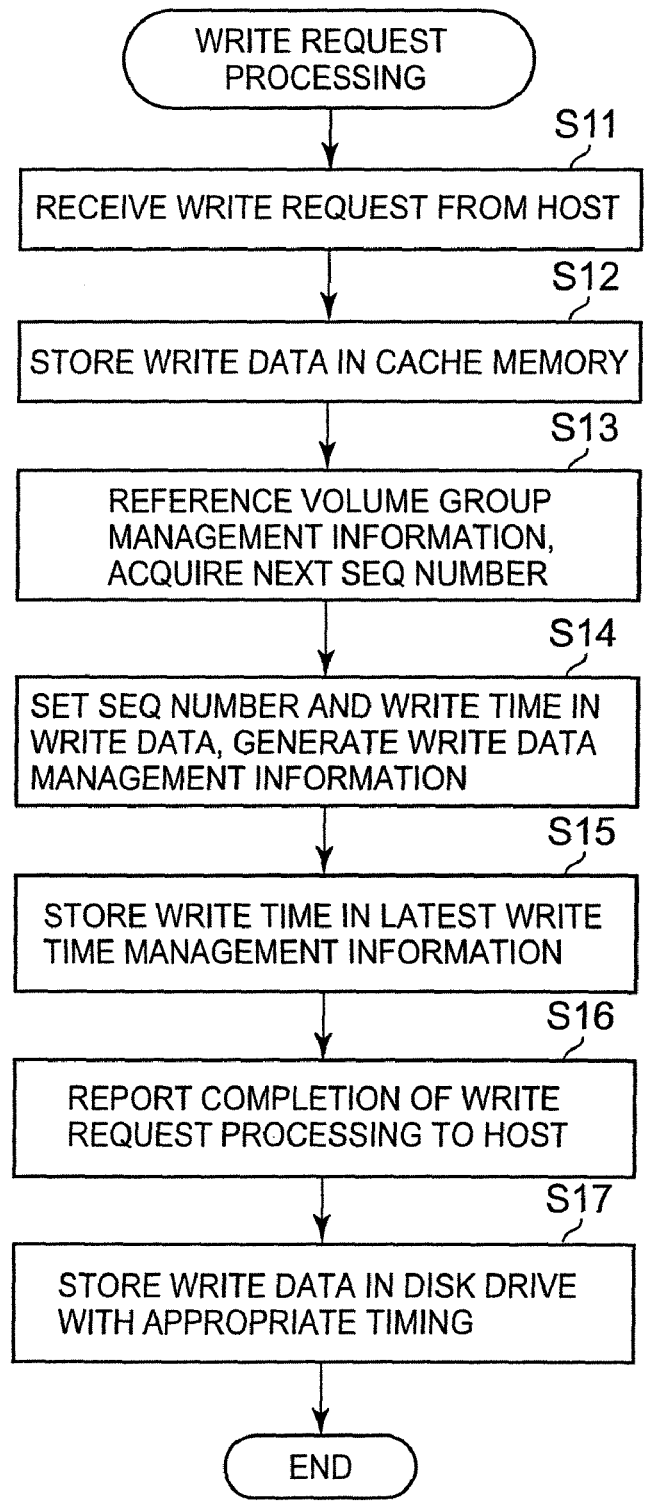
FIG. 10 is a flowchart showing a write request processing method.

FIG. 10 is a flowchart showing write request processing. This write request processing is executed by the controller 510 (more specifically, the write data reception portion 110) of the primary storage control device 10. For convenience of explanation, operation is assumed to take place primarily in the primary storage control device 10. However, in actuality one or a plurality of processors within the controller 510 can operate according to a prescribed program to process write requests. In this flowchart, and in the other flowcharts below also, the contents of processing are indicated only to the extent necessary for understanding and implementation of the invention, and are different from an actual program. Moreover, in the following explanations steps are abbreviated by "S".

The primary storage control device 10 receives a write request to write to a primary volume 530A from the primary host 31 (S11). This write request is provided with a write time by the primary host 31.

The primary storage control device 10 causes the write data received from the primary host 31 to be stored in cache memory 513 (S12). The primary storage control device 10 references the volume group management information T11, increments the sequential number which is already stored by one, and acquires the new sequential number (abbreviated to "SEQ" in the figure) (S13).

The primary storage control device 10 generates write data management information T13 by associating the acquired sequential number and write time with the write data received from the primary host 31 (S14). In this write data management information T13 are set the volume ID of the primary volume 530A specified as the write data write destination, a write address, as described above, and a write address and similar.

The primary storage control device 10 stores the write time indicated by the write request received in S11 in the latest write time management information T14 (S15). The primary storage control device 10 then notifies the primary host 31 of the completion of write request processing (S16).

That is, the primary storage control device 10 reports completion of writing of the write data to the primary host 31 prior to the actual writing of the write data to the primary volume 530A. After reporting completion of writing to the primary host 31, writing to the primary volume 530A and transfer to the secondary volume 530B are performed, and so the response performance of the primary storage control device 10 can be enhanced. Also, by this means write request processing can be performed quickly even when there is a large distance between the primary site Ps and the secondary site Ss, without causing the primary host 31 to be aware of delays due to the propagation time between the two sites. Hence the above-described asynchronous processing is suitable for a disaster recovery system in which there is a substantial distance between the primary site Ps and secondary site Ss.

Finally, the primary storage control device 10 writes the write data stored in cache memory 513 to the disk drives 521 comprised by the primary volume 530A with appropriate timing (S17). The method of writing to the disk drives 521 depends on the RAID configuration of the primary volume 530A. If the primary volume 530A is set as a RAID 1 volume, the same write data is written to both the primary disk drive and secondary disk drive. If the primary volume 530A is set to a configuration such as RAID 5 in which parity data is used, after calculating the new parity data, the write data and parity data are both written to a prescribed disk drive 521.

Figure 11:
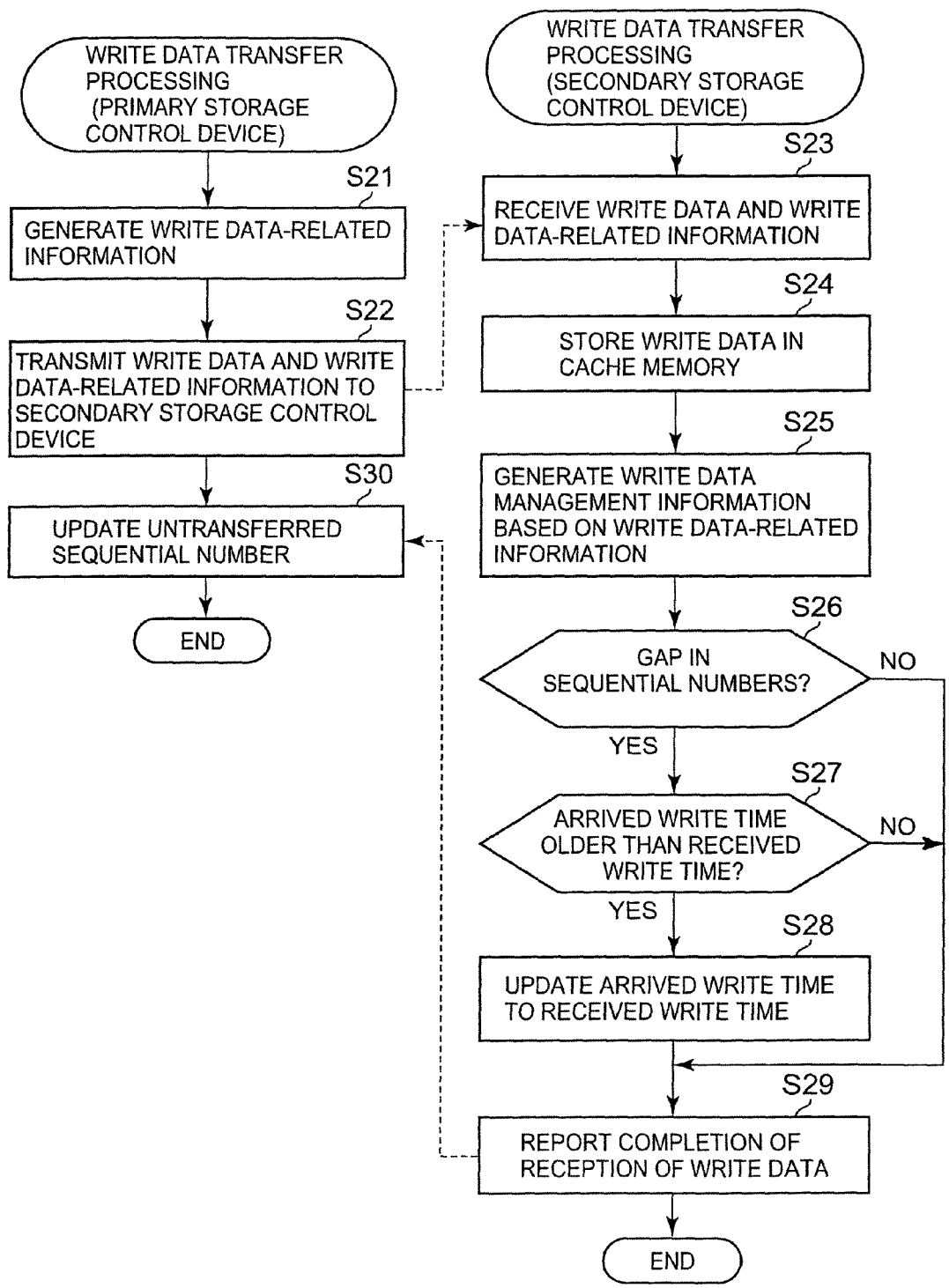
FIG. 11 is a flowchart showing remote copy processing (write data transfer processing)

FIG. 11 is a flowchart showing processing to transfer the write data from the primary storage control device 10 to the secondary storage control device 20 and copy the data to the secondary volume 530B. This processing is called write data transfer processing or remote copy processing.

The processing shown in FIG. 11 is executed by the write data transfer portion 120 of the primary storage control device 10 and by the write data reception portion 210 of the secondary storage control device 20. More specifically, as described above, one or a plurality of processes within both of the storage control devices 10, 20 execute a prescribed program to realize the processing shown in FIG. 11.

First, the primary storage control device 10 references the untransferred sequential number stored in the volume group management information T11, and specifies the write data which must be transferred to the secondary storage control device 20. Then, the primary storage control device 10 references the write data management information T13, volume group management information T11 and other-party volume information T12, to generate write data relation information (S21).

Write data relation information is information comprising various information necessary to manage write data within the secondary storage control device 20 which is the transfer destination (copy destination). Write data relation information comprises a write address, write data length, sequential number, write time, marker attribute bit, and marker type. The write address, sequential number and similar are acquired from the write data management information T13. The write data relation information also comprises information to specify the write data transfer destination. Information to specify the write data transfer destination is the other-party storage control device ID and other-party volume ID, acquired from the other-party volume information T12. Further, the write data relation information also comprises the other-party volume group ID, acquired from the volume group management information T11.

The primary storage control device 10 transfers in association the write data stored in cache memory 513 and the write data relation information created in S21 to the secondary storage control device 20 (S22).

The secondary storage control device 20, upon receiving the write data and write data relation information from the primary storage control device 10 (S23), stores the write data in cache memory 513 within the secondary storage control device 20 (S24).

The secondary storage control device 20 generates write data management information T23 based on the write data relation information received from the primary storage control device 10 (S25). The secondary storage control device 20 then judges whether there are gaps in the sequential numbers set in the write data received in S23 (S26).

If the sequential numbers are consecutive (S26: YES), the secondary storage control device 20 compares the write time of the latest write data received in S23 with the arrived write time stored in the arrived write time management information T24, and judges whether the arrived write time is earlier than the write time for write data received in S23 (S27). The judgment steps of S26 and S27 can be interchanged.

If the arrived write time stored in the arrived write time management information T24 is older than the write time of the write data received in S23 (S27: YES), the secondary storage control device 20 overwrites the arrived write time registered in the arrived write time management information T24 with the write time of the write data received in S23 (S28). The secondary storage control device 20 reports to the primary storage control device 10 that reception of the write data is complete (S29).

The primary storage control device 10, upon receiving the completion report from the secondary storage control device 20, updates the untransferred sequential number in the volume group management information T11 (S30). When write data transfer to the secondary storage control device 20 is completed, if this transferred write data has already been written to the primary volume 530A, the primary storage control device 10 can discard the write data stored in cache memory 513. When write data is being held for transfer to the secondary storage control device 20 separately from the purpose of writing to the primary volume 530A, after receiving the completion report from the secondary storage control device 20, this write data for transfer can be discarded.

In the processing shown in FIG. 11, write data and similar is transferred from the primary storage control device 10 to the secondary storage control device 20 (S22). In place of this, a configuration may be employed in which a write data transfer request is issued from the secondary storage control device 20 to the primary storage control device 10, and in response to this transfer request, the primary storage control device 10 transmits the write data and similar to the secondary storage control device 20. When such a configuration is employed in which write data and similar is transmitted from the primary storage control device 10 to the secondary storage control device 20 in response to a transfer request from the secondary storage control device 20, write data transfer processing can be performed according to the state of the secondary storage control device 20. That is, the write data or similar can be transferred from the primary storage control device 10 to the secondary storage control device 20 according to, for example, the write data processing status, load amount, amount of accumulated write data (usage ratio of cache memory 513), and similar in the secondary storage control device 20.

It was stated that in the processing shown in FIG. 11, the secondary storage control device 20 stores the write data in cache memory 513 (S24). Instead of this, when the secondary storage control device 20 has a journal volume 531B, write data can be stored in the journal volume 531B. In general, a journal volume 531B can be configured with a larger storage capacity than cache memory 513, and so a larger amount of write data can be accumulated. When using a journal volume 531B, the cache memory 513 is employed as a cache area of the secondary volume 530B and the journal volume 531B.

Similarly in the primary storage control device 10 also, a journal volume 531A can be used as a cache area.

The volume size of the journal volume 531B can be variably set. For example, initially the size of the journal volume 531B may be set to a small value, and when the amount of write data transferred from the primary storage control device 10 increases, the size of the journal volume 531B can be increased according to the increase in the amount of write data transferred.

Figure 12:
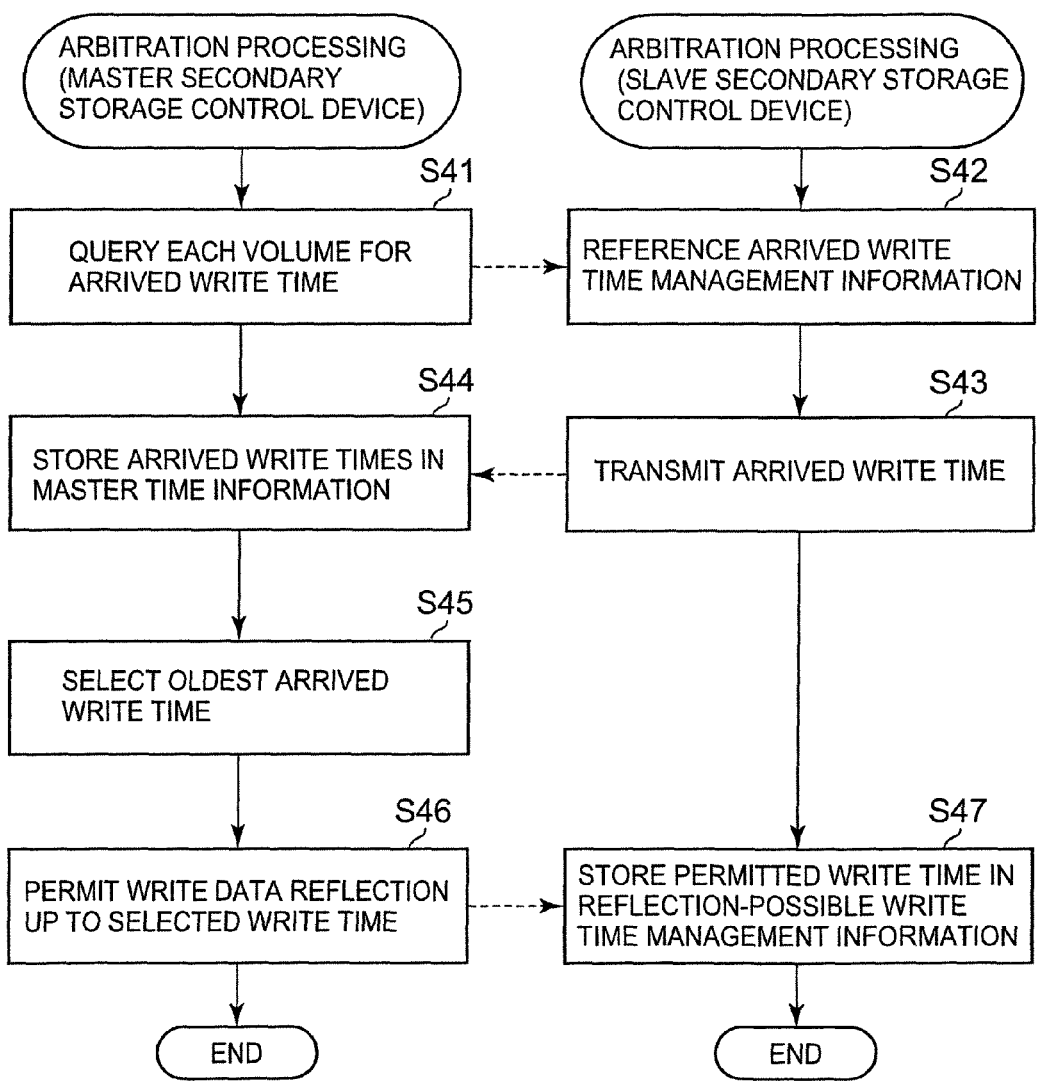
FIG. 12 is a flowchart showing arbitrary processing to control the reflection periods of each secondary volume.

FIG. 12 is a flowchart showing arbitration processing to synchronize reflection processing in remote copying executed by the various secondary storage control devices 20 and the plurality of reflection processing operations. In this embodiment, consistency of data among the secondary volumes 530B is ensured by this arbitration processing. The master processing portion 230 runs on one of the secondary storage control devices 20. In the figure, the secondary storage control device 20 on which the master processing portion 230 is running is called the master secondary storage control device, and another secondary storage control device 20 receiving instructions from the master processing portion 230 is called a slave secondary storage control device 20.

The master processing portion 230 queries the latest arrived write times stored in the arrived write time management information T24 for each secondary volume group 540B belonging to the extended group 550 (S41). The master processing portion 230 issues queries for the latest arrived write times to the controllers 510 of each of the secondary storage control devices 20, via the update control paths CN13.

Upon receiving the query from the master processing portion 230, each of the secondary storage control devices 20 reference the arrived write time management information T24 (S42), and transmit the arrived write time stored therein to the master processing portion 230 (S43).

The master processing portion 230 records the arrived write times received from each of the secondary storage control devices 20 to the master time information T28 (S44). The master processing portion 230 compares the arrived write times recorded in the master time information T28 to detect, among these, the single oldest arrived write time (S45). This detected oldest arrived write time is selected as the reflection-possible write time. The master processing portion 230 then permits each of the secondary storage control devices 20 to write the arrived write data up to the reflection-possible write time to the secondary volume 530B (S46).

Each secondary storage control device 20 stores the reflection-possible write time of the notification from the master processing portion 230 in the reflection-possible write time management information T25 (S47). With the arbitration processing of S41 through S47 as one cycle, the master processing portion 230 repeats this arbitration processing either periodically or irregularly.

As described above, in arbitration processing, instructions and responses are exchanged between the secondary storage control device on which the master processing portion 230 is running (the master secondary storage control device) and the other secondary storage control devices 20, via update control paths CN13. Hence by monitoring the states of exchange of these instructions and responses, it is possible to detect whether faults have occurred in the secondary storage control devices 20 or in the update control paths CN13. For example, if there has been no response from another secondary storage control device 20 to an instruction from the master processing portion 230 within a fixed period of time, the occurrence of a fault can be inferred.

Figure 13:
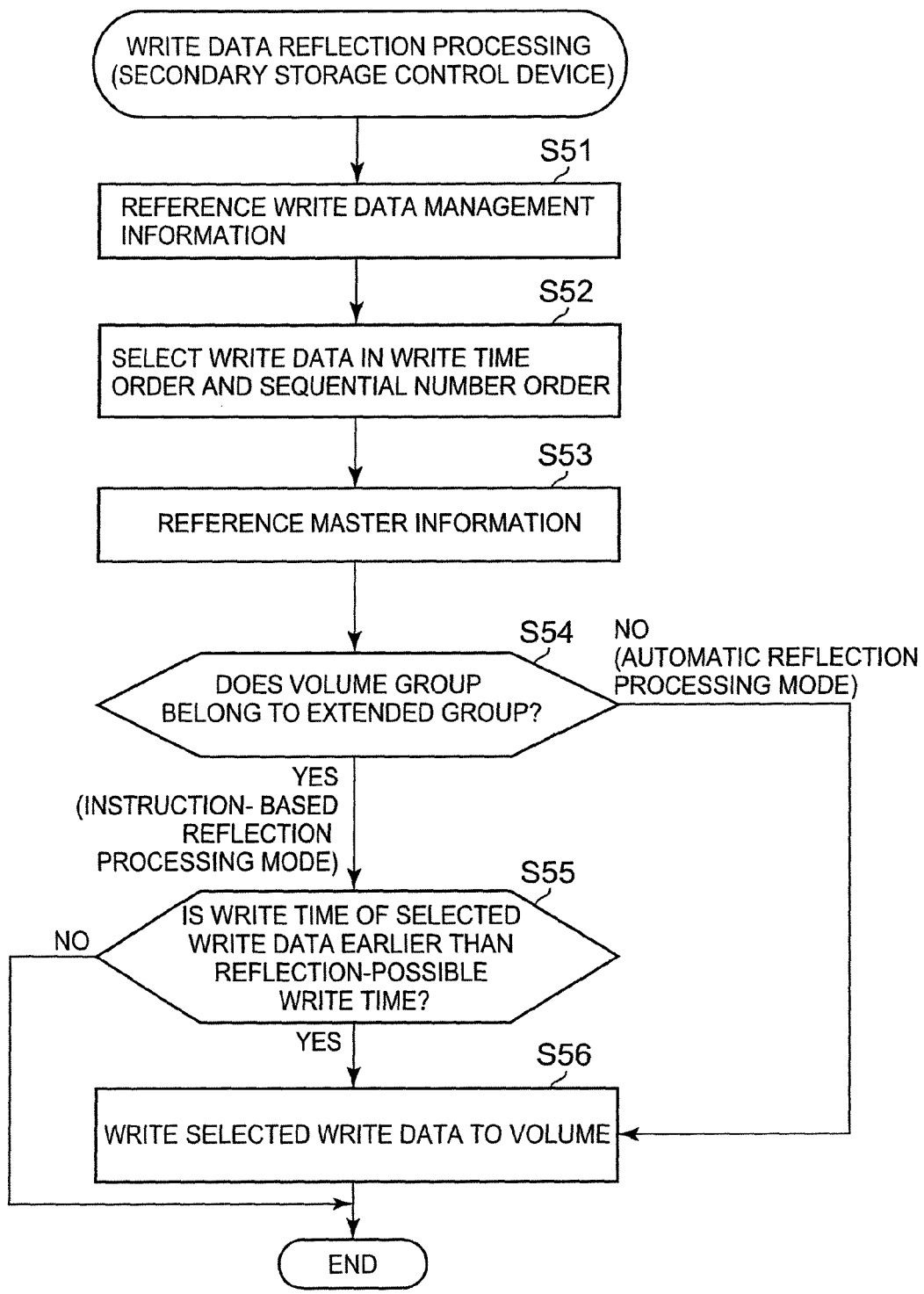
FIG. 13 is a flowchart showing processing to cause reflection by writing write data to a secondary volume.

FIG. 13 is a flowchart showing write data reflection processing in the secondary volumes 530B of a secondary storage control device 20. Reflection processing is processing to update the contents of the secondary volumes 530B by writing write data received from a primary storage control device 10 to the secondary volumes 530B. The write data reflection portion 220 performs reflection processing by secondary volume group 540B. Below, this operation is described from the standpoint of a secondary storage control device 20.

The secondary storage control device 20 references the write data management information T23 regarding a secondary volume 530B belonging to a certain secondary volume group 540B (S51), and selects write data management information T23 in write time order and sequential number order (S52). By this means, the order of storage of arrived write data in the secondary volume 530B is determined.

The secondary storage control device 20 references the master information T26 of the secondary volume group 540B (S53), and judges whether the secondary volume group 540B belongs to an extended group 550 (S54). That is, the secondary storage control device 20 judges whether master information T26 has been set for the secondary volume group 540B.

When the secondary volume group 540B belongs to an extended group 550 (S54: YES), the secondary volume group 540B is an object of synchronous reflection processing. Hence the secondary storage control device 20 compares the write time for write data selected in S52 with the reflection-possible write time stored in the reflection-possible write time management information T25 (S55). When the write time for the selected write data is earlier than the reflection-possible write time (S55: YES), the secondary storage control device 20 writes the selected write data to the secondary volume 530B (S56). That is, the secondary storage control device 20 references the write data management information T23 for the write data to be written, identifies the write address and write data length, and causes the write data to be stored in the prescribed location of the secondary volume 530B.

On the other hand, when the write time for write data selected in S52 is later than the reflection-possible write time (S55:NO), the secondary storage control device 20 does not write the selected write data to the secondary volume 530B and leaves it as it is.

On the other hand, if the secondary volume group 540B does not belong to an extended group 550 (S54: NO), the secondary storage control device 20 skips S55 and moves to S56, and writes the write data for writing to the secondary volume 530B. This is because, if the secondary volume group 540B does not belong to an extended group 550, the secondary volume group 540B is not an object for synchronous reflection processing.

Taking the above-described reflection processing of S51 through S56 as one cycle, the secondary storage control device 20 performs reflection processing for each secondary volume 530B. By this means, the secondary storage control device 20 can write the write data received up to the reflection-possible write time for secondary volume groups 540B belonging to an extended group 550, in write time order and in sequential number order, to secondary volumes 530B.

Here, the operation in which a write time and the reflection-possible write time are compared, and write data up to the reflection-possible write time is written to a secondary volume 530B in write time order and sequential number order, is called "instruction-based reflection processing mode" in the following explanation. On the other hand, an operation in which all the arrived write data is written to a secondary volume 530B in write time order and sequential number order is called "automatic reflection processing mode". In "instruction-based reflection processing mode", the update period of each secondary volume 530B belonging to an extended group 550 coincides with the time permitted by the master processing portion 230 (reflection-possible write time), and so this mode can also be called a "synchronous reflection processing mode". In addition, the "automatic reflection processing mode" can also be called a first reflection processing mode, and the "instruction-based reflection processing mode" can be called a second reflection processing mode.

Thus when in the "instruction-based reflection processing mode", write data up to the reflection-possible write time specified by the master processing portion 230 is reflected in each secondary volume 530B belonging to the extended group 550.

Hence even when a plurality of remote copy tasks, with asynchronous data transfer timing and buffering over data transfer paths, are being performed in parallel, consistency of the stored contents of secondary volumes 530B can be maintained.

By this means, if for example a fault occurs in a primary storage control device 10 or similar, and certain write data has not arrived at the secondary volume 530B, write data which was issued after the write data which has not arrived is not allowed to be reflected in the secondary volume 530B. Hence consistency is maintained in each secondary volume 530B belonging to the extended group 550, without changes in update order or omission of a portion of the write data. As a result, the secondary host 32 can use secondary volumes 530B the consistency of which is assured to take over the task processing of the primary host 31, and highly reliable failover can be realized.

Figure 14:
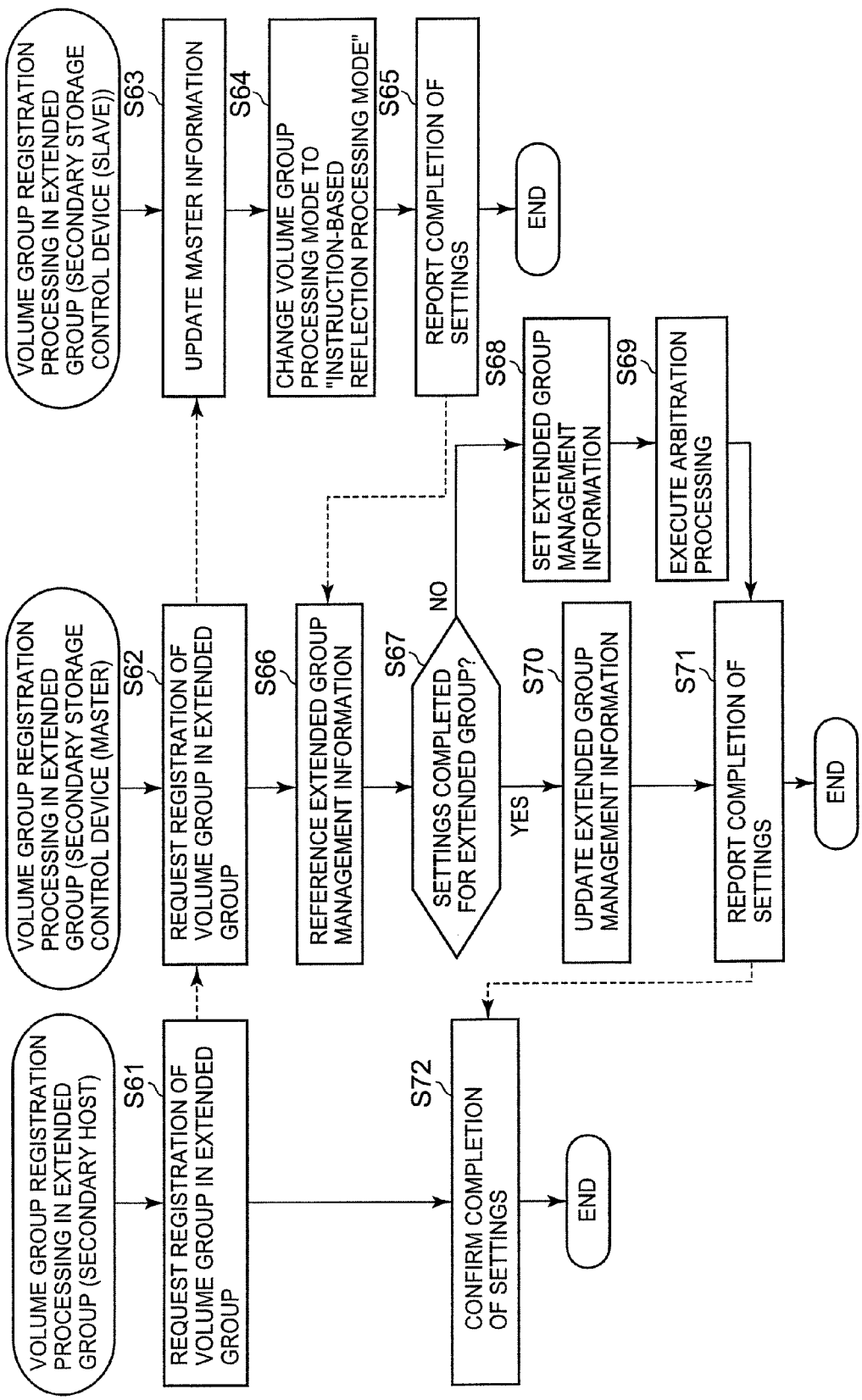
FIG. 14 is a flowchart showing processing to register a volume in an extended group for arbitration processing.

FIG. 14 is a flowchart showing processing to register a secondary volume group 540B in an extended group 550. As explained above, when the secondary volume group 540B is registered in an extended group 550, the "instruction-based reflection processing mode" is employed for secondary volumes 530B belonging to this secondary volume group 540B.

First, the management portion 312 of the secondary host 32 (hereafter, the secondary host 32) issues a request to the master secondary storage control device 20, in which the master processing portion 230 is running, for registration of the secondary volume group 540B in the extended group 550 (S61). This registration request comprises, for example, the extended group ID of the extended group 550 for registration, the volume group ID indicating the secondary volume group 540B for which registration in the extended group 550 is desired, and the storage control device ID of the secondary storage control device 20 in which the secondary volume group 540B is provided.

The master processing portion 230, upon receiving the registration request from the secondary host 32, issues a request to the secondary storage control device 20 having the specified secondary volume group 540B for registration of the specified secondary volume group 540B in the extended group 550 (S62). The request issued from the master processing portion 230 comprises, for example, a volume group ID and extended group ID specified by the secondary host 32.

Upon receiving the request from the master processing portion 230, the secondary storage control device 20 sets the master information T26 (S63). That is, the secondary storage control device 20 having the secondary volume group 540B for registration sets, in the master information T26 corresponding to the specified volume group ID, the specified extended group ID and the storage control device ID of the secondary storage control device 20 having the master processing portion 230 (S63).

The secondary storage control device 20 which has set the master information T26 changes the processing mode for the secondary volume group 540B registered in the extended group 550 from "automated reflection processing mode" to "instruction-based reflection processing mode" (S64). Having changed the processing mode, the secondary storage control device 20 reports completion of registration processing to the master secondary storage control device 20 (S65).

The master secondary storage control device 20 references the extended group management information T27 (S66), and judges whether the extended group ID set in the master information T26 in S63 is registered in the extended group management information T27 (S67).

If the extended group ID is not registered in the extended group management information T27 (S67: NO), then this is the first secondary volume group 540B to be registered with this extended group ID. Hence the master secondary storage control device 20 sets, in the extended group management information T27, the new extended group ID, the storage control device ID of the secondary storage control device 20, and the volume group ID of the secondary volume group 540B (S68). Moreover, the "number of volume groups" is set to "1".

Then, the master secondary storage control device 20 causes the above-described arbitration processing to be executed from the secondary volume groups 540B belonging to the newly established extended group 550 (S69). That is, when the extended group 550 is newly set (S67: NO), the master secondary storage control device 20 ensures consistency of the stored contents of each of the secondary volumes 530B belonging to the extended group 550.

On the other hand, if the extended group ID set in the master information T26 in S63 has already been registered in the extended group management information T27 (S67: YES), the master secondary storage control device 20 updates the contents relating to the extended group ID (S70). That is, the master secondary storage control device 20 sets the volume group ID of the added secondary volume group 540B and the storage control device ID of the secondary storage control device 20 having the added secondary volume group 540B in the extended group management information T27. The master secondary storage control device 20 also increments the "number of volume groups" by one.

After completion of modification of the settings in the extended group management information T27, the master secondary storage control device 20 reports the completion of registration of the secondary volume group 540B in the extended group 550 to the secondary host 32 (S71). By this means, the secondary host 32 confirms the completion of registration in the extended group 550. For convenience in the explanation, in FIG. 14 the master secondary storage control device 20 reports the completion of settings to the secondary host 32 after arbitration processing (S69); but the completion of settings may be reported after settings are made in the extended group management information T27 (S68).

Figure 15:
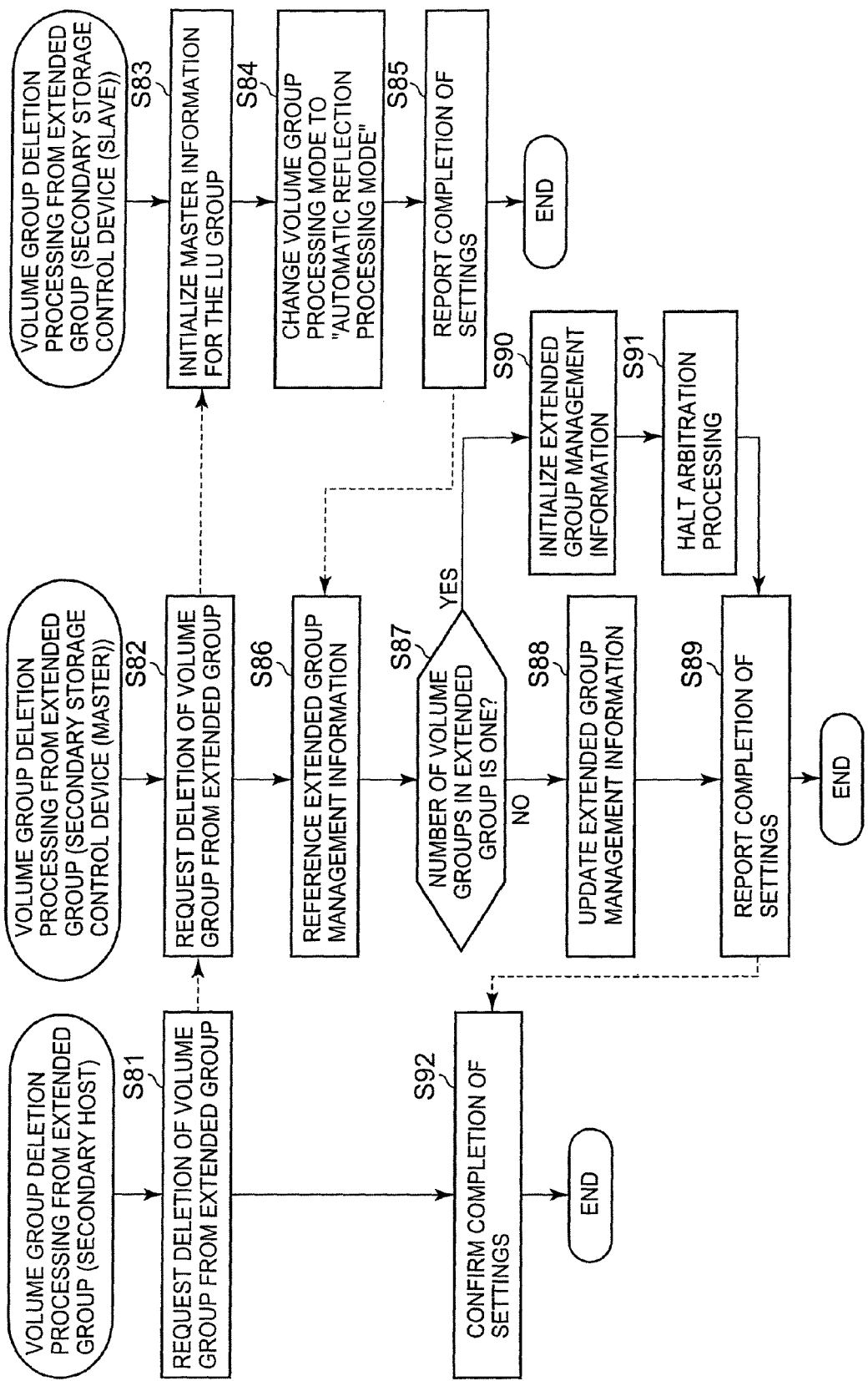
FIG. 15 is a flowchart showing processing to delete a volume from an extended group.

FIG. 15 is a flowchart showing processing to delete a secondary volume group 540B from an extended group 550.

The secondary host 32 issues a request to the master secondary storage control device 20 to delete a secondary volume group 540B from an extended group 550 (S81). This deletion request comprises, for example, the volume group ID of the secondary volume group 540B for deletion, the storage control device ID of the secondary storage control device 20 having the secondary volume group 540B for deletion, and the extended group ID of the extended group 550 to which the secondary volume group 540B for deletion belongs.

The master secondary storage control device 20, upon receiving the deletion request from the secondary host 32, issues a request to the secondary storage control device 20 specified by the storage control device ID for deletion of the secondary volume group 540B from the extended group 550 (S82). This deletion request comprises, for example, the volume group ID of the secondary volumes 530B for deletion and the extended group ID of the extended group 550.

Upon receiving the deletion request from the master secondary storage control device 20, the secondary storage control device 20 initializes the master information T26 relating to the specified secondary volume group 540B (S83). Then, this secondary storage control device 20 changes the processing mode of the secondary volume group 540B, registration of which in the extended group 550 has been cancelled, from "instruction-based reflection processing mode" to "automatic reflection processing mode" (S84). Having changed the processing mode, the secondary storage control device 20 then reports completion of deletion from the extended group 550 to the master secondary storage control device 20 (S85).

Upon receiving the report of completion issued in S85, the master secondary storage control device 20 references the extended group management information T27 (S86), and judges whether the "number of volume groups" set for the extended group 550 from which the secondary volume group 540B has been deleted is "1" or not (S87).

If the "number of volume groups" set for the extended group 550 is "2" or greater (S87: NO), the master secondary storage control device 20 reduces by one the value of the "number of volume groups", and erases the volume group ID of the deleted secondary volume group 540B from the extended group management information T27 (S88).

If the "number of volume groups" set for the extended group 550 from which the secondary volume group 540B has been deleted is "1" (S87: YES), the master secondary storage control device 20 initializes the extended group management information T27 for the extended group 550 (S90). This is because there are no secondary volume groups 540B registered in this extended group 550. The master secondary storage control device 20 then halts arbitration processing (S91).

The master secondary storage control device 20 notifies the secondary host 32 of the completion of deletion of the secondary volume group 540B from the extended group 550 (S89). By this means, the host 32 confirms the completion of deletion of the secondary volume group 540B from the extended group 550 (S92).

Here, the conditions for ensuring consistency of the stored contents of each of the secondary volume groups 540B belonging to an extended group 550 are considered. First, the conditions relating to establish copying (initial copying) are examined.

Establish copying is copying to bring into coincidence the difference between the primary volume 530A and the secondary volume 530B at the time of the start of remote copying. In establish copying, data at places of difference is copied from the primary volume 530A to the secondary volume 530B.

Establish copying can be performed in parallel with the remote copying of write data described above. That is, while eliminating differences between the primary volume 530A and the secondary volume 530B, write data newly written from the primary host 31 to the primary volume 530A can be transferred and copied to the secondary volume 530B.

However, data transmitted from the primary volume 530A to the secondary volume 530B in establish copying is data already written to the primary volume 530A, and no write time (time of issue of the write request by the primary host 31) is assigned. Hence during execution of establish copying, the write order (reflection order) of the write data cannot be ascertained on the side of the secondary storage control device 20, and so data consistency cannot be ensured.

In this case, data consistency between primary and secondary volumes is secured at the time of completion of establish copying. For example, if the state of the secondary volume 530B during establish copying is the "Duplex Pending state", and the state of the secondary volume 530B after completion of establish copying is the "Duplex State", then data consistency is secured at the time of the change from the "Duplex Pending state" to the "Duplex state".

However, when a secondary volume group 540B for which establish copying has been completed is registered in an extended group 550, as stated in S69 of FIG. 14, arbitration processing is executed from the time of registration in the extended group 550.

Hence at the time the secondary volume group 540B is registered in the extended group 550, the stored contents may be different in each of the secondary volumes 530B in each secondary volume group 540B belonging to the extended group 550. That is, even when volumes belong to the same extended group 550, there is the possibility of temporal shifts in the stored contents of the secondary volumes 530B.

Such "shifts" continue until secondary volume groups 540B for which remote copy processing is delayed have caught up to other secondary volume groups 540B for which remote copy processing is more advanced. Hence in such cases, data consistency is secured when the following equation (1) is satisfied.

$$\text{Reflection-possible write time} \geq \text{arrived write times of secondary volume groups registered in extended group} \quad (1)$$

That is, equation (1) indicates that the reflection-possible write time specified for the extended group 550 is the same as or later than the latest arrived write time for secondary volume groups 540B registered in the extended group 550.

Hence the secondary storage control device 20 performs monitoring to determine whether the condition of equation (1) is satisfied, and until the condition of equation (1) is satisfied, treats the states of the secondary volumes 530B registered in the extended group 550 as the "Duplex Pending state" (the state during establish copying).

That is, the secondary storage control device 20 treats the secondary volumes 530B of secondary volume groups 540B registered in the extended group 550 as in the "Duplex Pending state" during the period in which the condition of equation (1) is not satisfied, even when in actuality establish copying has been completed (Duplex state), and treats the secondary volumes 530B as in the "Duplex state" when the condition of equation (1) is satisfied. By this means, it is possible to know, in conjunction with the above-described condition relating to establish copying, that in the "duplex pending state" consistency is not secured, whereas in the "duplex state" consistency is secured. A secondary storage control device 20 and primary storage control device 10 which establish a remote copy pair can provide information as to whether data consistency is secured to, for example, the primary host 31, secondary host 32, management server 43, or similar.

Because of the above-described configuration of this embodiment, even when a plurality of remote copy operations are being executed asynchronously, the stored contents of a plurality of secondary volumes 530B can be unified on the stored contents at a prescribed single time (the reflection-possible write time). By this means, consistency can be maintained between the plurality of different volumes 530B to which remote copying is applied, and convenience of use and reliability can be enhanced.

Embodiment 2

Next, processing to halt remote copying is explained. Processing to halt remote copying is also called suspend processing. In a system which performs remote copying, there are cases in which the need to halt remote copying arises. Such cases may be, for example, when performing maintenance of various equipment in the storage system, or when modifying the configuration of the storage system. In such cases, there is a need to halt remote copying.

In this embodiment, as explained above, all of the secondary storage control devices 20 cooperate to execute remote copy processing. Hence the secondary storage control devices 20 must cooperate to perform suspend processing.

A number of different types of suspend processing exist, depending on the source of the instruction to halt copying (the suspend instruction source) and the specifications relating to suspend processing (for example, specifications relating to the processing time and processing results). The suspend instruction source may be the primary host 31 or secondary host 32. Specifications relating to suspend processing include "flush", "purge", "swap", and similar. Below, each type of suspend processing is explained.

Figure 16:
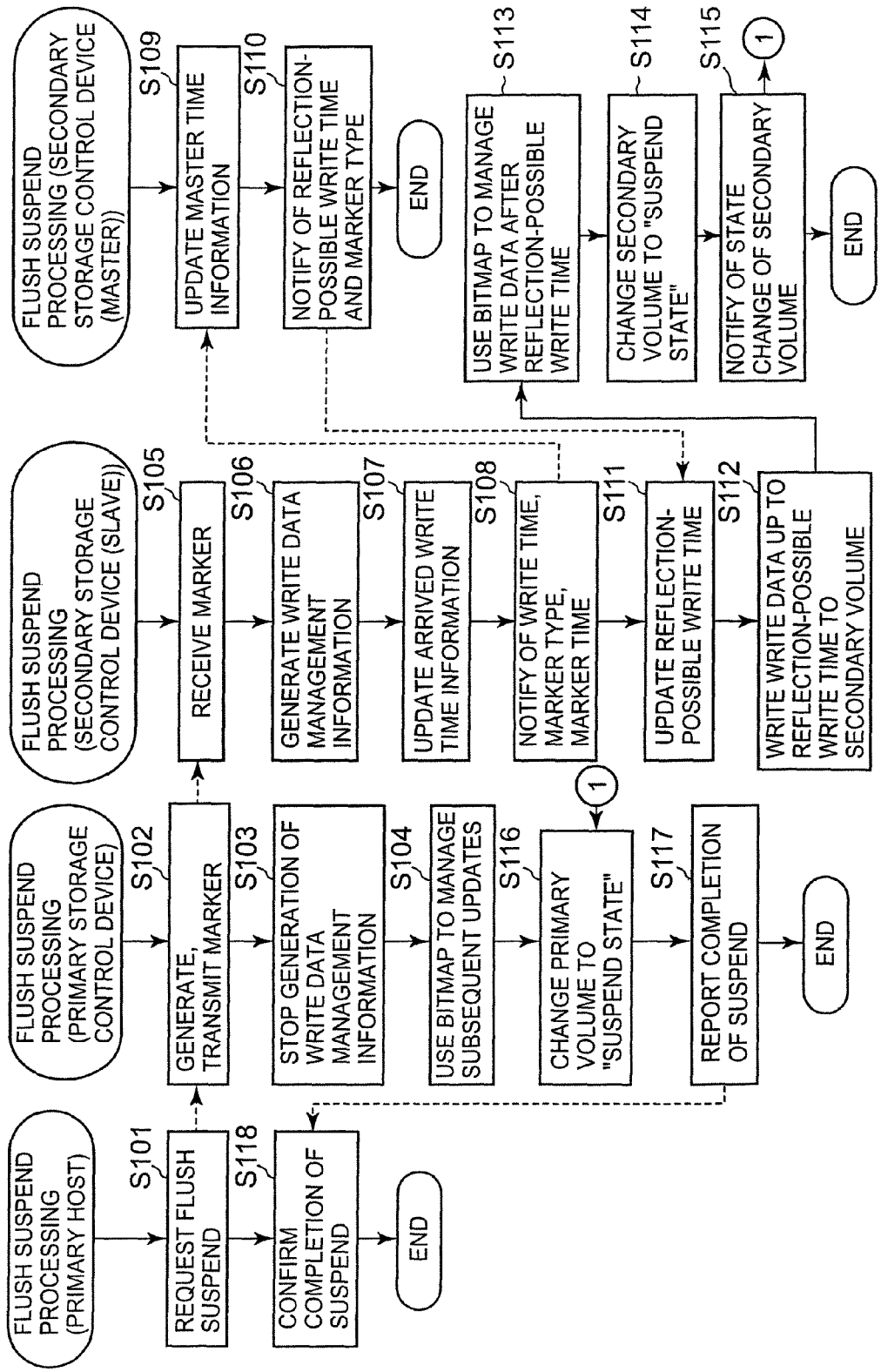
FIG. 16 is a flowchart showing flush suspend processing, executed in the storage system of a second embodiment.

FIG. 16 is a flowchart showing flush suspend processing when the primary host 31 has issued a flush suspend request.

The management portion 311 of the primary host 31 (hereafter, the primary host 31) issues a suspend request, specifying "flush" as the suspend type, to a primary storage control device 10 (S101). This suspend request comprises, for example, the suspend type and the time of issue of the suspend request. The suspend request is transmitted from the primary host 31, via data input/output paths CN11, to the primary storage control device 10 having primary volumes 530A corresponding to the extended group 550 which is the suspend object.

The marker creation portion 130 of the primary storage control device 10 creates a marker, and transmits the marker to the secondary storage control device 20 having secondary volume groups 540B which are suspend objects (S102). That is, the marker creation portion 130 references the volume group management information T21, acquires one new sequential number, and generates write data management information for use as a marker. The marker creation portion 130 sets the marker attribute bit to on, and sets the marker type to "flush suspend". As described above, the marker attribute bit is a bit indicating that the write data is a marker, and for normal write data is set to off, but in the case of a marker is set to on. As the write time in the marker, the time at which the suspend request was issued by the primary host 31 is recorded.

Similarly to the write data reception portion 110, the marker creation portion 130 acquires a new sequential number increased by one from the previous value and sets a marker, and also records the newly acquired sequential number in the volume group management information T11. The marker is configured similarly to that in the write data management information, and is transmitted to the secondary storage control device 20. However, because the marker is control information to control the remote copying operation, it is not written to the secondary volumes 530B.

After marker creation, the primary storage control device 10 stops new generation of write data management information relating to primary volumes 530A which are suspend objects (S103), and manages all subsequent updates by the primary host 31 through differential bitmaps T15 (S104). That is, until remote copying is resumed, the primary storage control device 10 manages new write requests for primary volumes 530A for which remote copying is halted through differential bitmaps T15.

Upon receiving the marker from the primary storage control device 10 (S105), the secondary storage control device 20 having the secondary volume groups 540B which are suspend objects creates write data management information T23 by means of the write data reception portion 210 (S106). The write data management information T23 created based on the marker records the write time (suspend request issue time), marker attribute bits, and marker type.

The write data reception portion 210 updates the arrived write time in the arrived write time management information T24 for the secondary volume groups 540B which are suspend objects, and records the marker type and marker time (S107). As the arrived write time, the write time set in the flush suspend request is recorded.

As explained above, in arbitration processing the master processing portion 230 collects the latest arrived write times from each of the secondary storage control devices 20 (S41 through S44 in FIG. 12). Having received the suspend request marker, the secondary storage control device 20, upon receiving a query of the arrived write time from the master processing portion 230, notifies the master processing portion 230 of the marker type and marker time in addition to the write time recorded in the arrived write time management information T24 (S108).

The master processing portion 230 records the write time, marker type and similar received from the secondary storage control device 20 in the master time information T28 (S109). As described above, the master processing portion 230 compares the arrived write times collected from each of the secondary storage control devices 20, and selects the oldest arrived time as the reflection-possible write time. The master processing portion 230 notifies each of the secondary storage control devices 20 of the selected reflection-possible write time and marker type (S110).

Upon receiving the reflection-possible write time and marker type from the master processing portion 230, each of the secondary storage control devices 20 records the reflection-possible write time and marker type in the reflection-possible write time management information T25 (S111).

Each of the secondary storage control devices 20 writes the write data up to the reflection-possible write time to the secondary volumes 530B which are suspend objects (S112), and without writing write data later than the reflection-possible write time to secondary volumes 530B, manage this write data using differential bitmaps T29 (S113). That is, in the event of a flush suspend request, a secondary storage control device 20 reflects the write data up to the reflection-possible write time in secondary volumes 530B, but does not write any write data after the reflection-possible write time to secondary volumes 530B, instead managing the modified places of the secondary volumes 530B using a differential bitmap T29. The method of differential management using a differential bitmap is for example disclosed in Japanese Patent Laid-open No. 2004-13367.

Each of the secondary storage control devices 20 then changes the state of each secondary volume 530B in a secondary volume group 540B specified as a suspend object to the "suspend state" (S114), and notifies the primary storage control device 10 of the completion of the change of state of the secondary volumes 530B (S115). This state change notification is transmitted from the secondary storage control devices 20 to the primary storage control devices 10 via the remote copy paths CN12.

Upon receiving the state change notification from a secondary storage control device 20, a primary storage control device 10 changes the state of the primary volume 530A to the "suspend state" (S116). The primary storage control device 10 then notifies the primary host 31 of the completion of suspend processing (S117). By this means, the primary host 31 confirms that remote copying has been halted (s118).

By performing this flush suspend processing, all write data which has been updated before the time of issue of the flush suspend request is reflected in each of the secondary volumes 530B which is an object of arbitration processing, after which remote copying can be halted. Write data occurring after the issue of the flush suspend request is subjected to differential management. Hence the consistency of data can be maintained when halting remote copying.

For example, when, after halting the issue of write requests, the primary host 31 issues a flush suspend request, suspend processing can be completed in a state in which the stored contents of primary volumes 530A and the stored contents of secondary volumes 530B are in coincidence.

Figure 17:
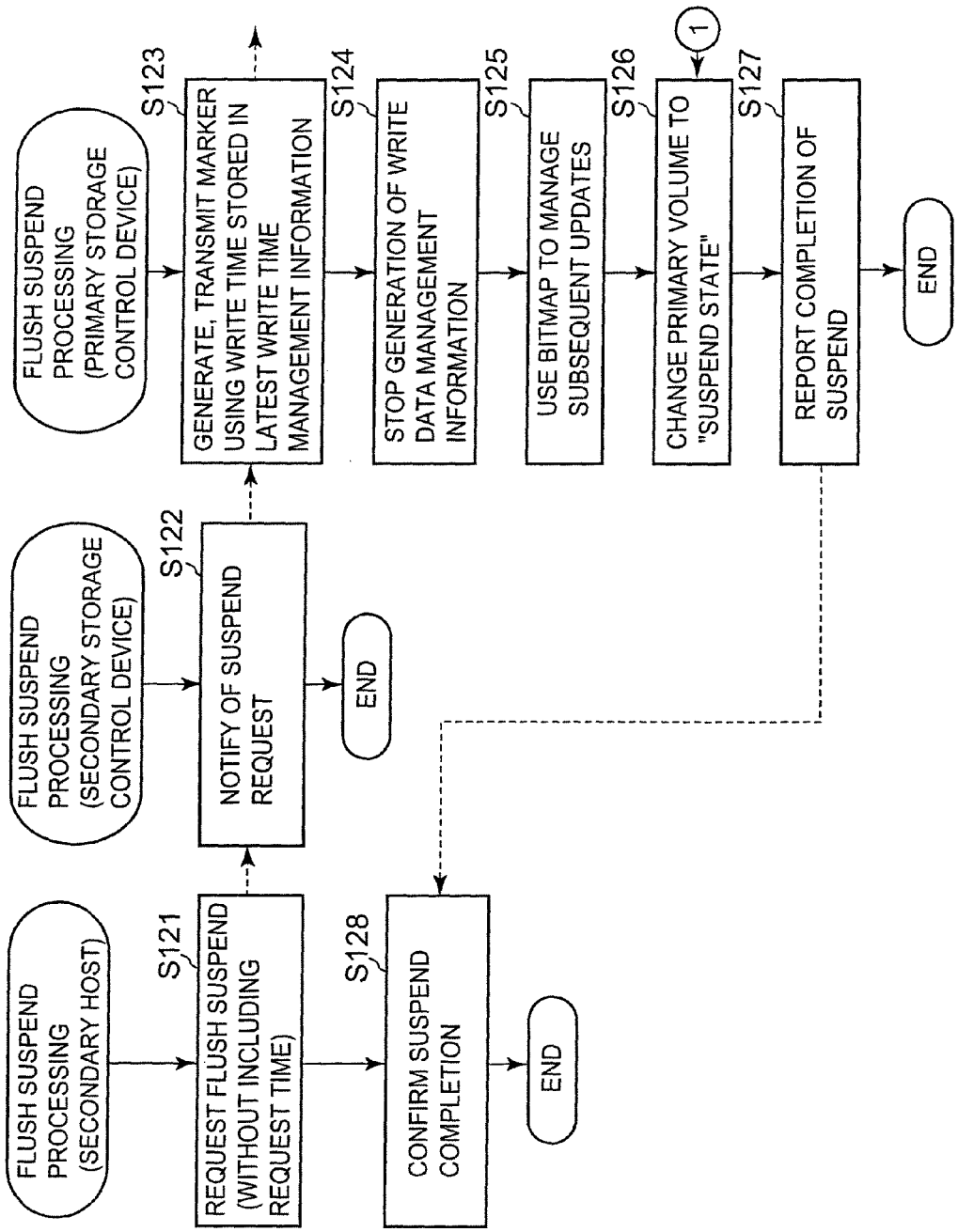
FIG. 17 is a flowchart showing a case in which flush suspend processing is executed through an instruction from a secondary host.

FIG. 17 is a flowchart showing processing when a flush suspend request is issued from the secondary host 32. The secondary host 32 is a standby-system host which is not normally used, but is employed when a fault occurs at the primary site Ps. This secondary host 32 can also issue a flush suspend request.

The management portion 312 of the secondary host 32 issues a flush suspend request to a prescribed secondary storage control device 20 via the data input/output paths CN11 (S121). The prescribed secondary storage control device 20 is a secondary storage control device 20 having one of the secondary volume groups 540B belonging to the extended group 550 which is the suspend object. Here, the secondary host 32 cannot utilize the time information (reference timer) used by the primary host 31, and so a suspend request issue time is not included in the flush suspend request issued in S121.

Having received the suspend request issued by the secondary host 32, the secondary storage control device 20 notifies the primary storage control device 10 of the suspend request via the remote copy paths CN12 (S122). The marker creation portion 130 of the primary storage control device 10 creates a marker in a manner similar to the processing of a suspend request from the primary host 31 described in conjunction with FIG. 16, and notifies the secondary storage control device 20 of the created marker (S123). However, in contrast with the marker creation step in FIG. 16, as the write time comprised by the marker, the write time recorded in the latest write time management information T14 is used.

Below, similarly to the processing described in FIG. 16, the primary storage control device 10 stops generation of new write data management information (S124), and uses differential bitmaps T15 to manage subsequent updates from the primary host 31 (S125). Upon receiving notification from the secondary storage control device 20 that the secondary volumes 530B have been changed to the "suspend state", the primary storage control device 10 changes the primary volumes 530A to the "suspend state" (S126). The primary storage control device 10 notifies the secondary host 32 of the completion of suspend processing (S127). By means of this notification, the secondary host 32 confirms the completion of suspend processing (S128).

In this way, even when the primary host 31 cannot issue a flush suspend request, the latest write times managed by the primary storage control devices 10 can be used to issue a flush suspend request from the secondary host 32. Thus remote copying can be halted after reflecting the write data from times before the latest write time in the secondary volumes 530B.

Embodiment 3

Figure 18:
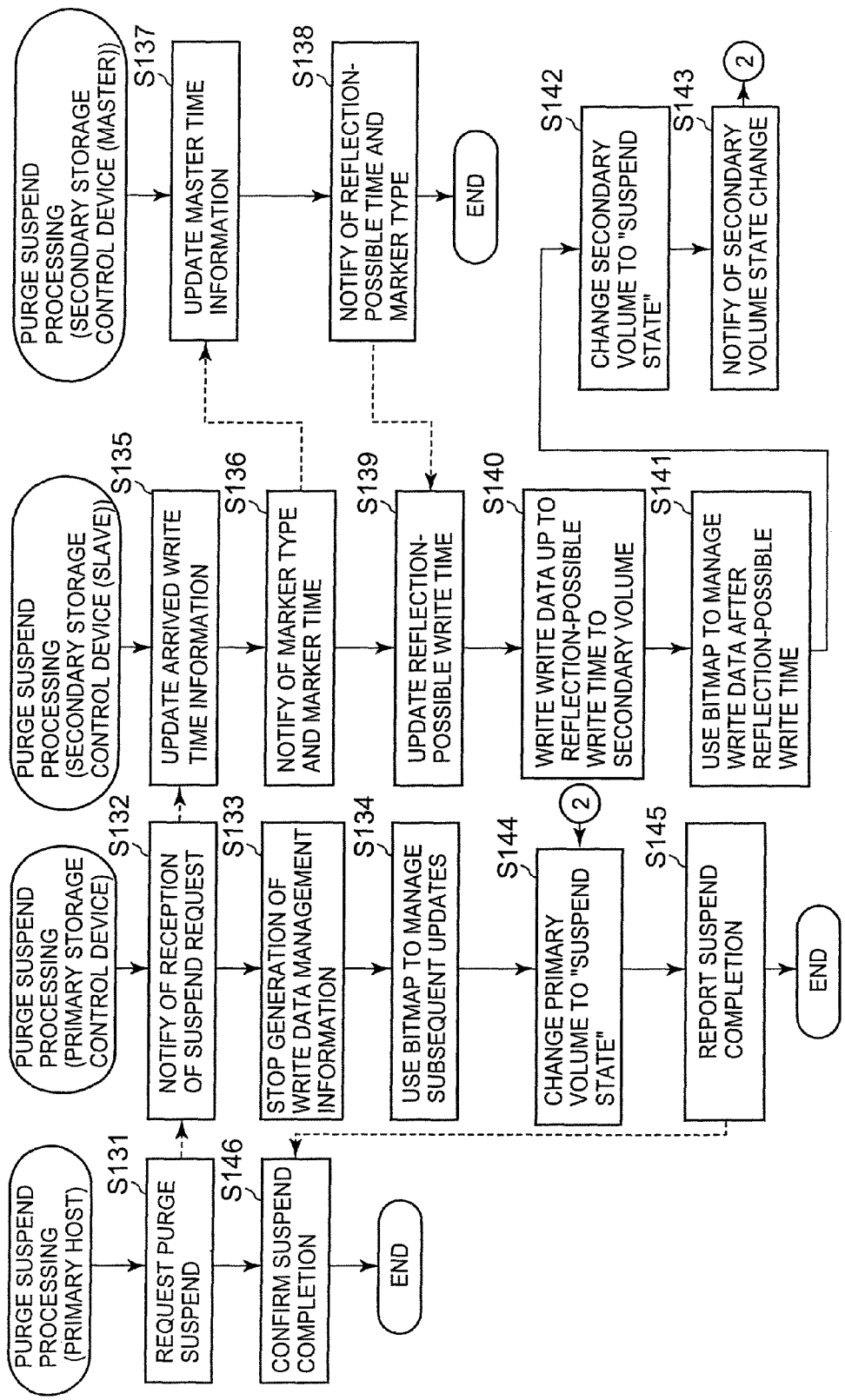
FIG. 18 is a flowchart showing purge suspend processing, executed in the storage system of a third embodiment.

FIG. 18 is a flowchart showing purge suspend processing. Purge suspend processing, similarly to flush suspend processing, is processing to halt copying with consistency maintained. However, purge suspend processing differs from flush suspend processing in that, with respect to updates to primary volumes 530A performed before the suspend request is issued, copy halting is completed without waiting for updates to secondary volumes 530B of write data.

The management portion 311 of the primary host 31 issues a suspend request, specifying "purge" as the suspend type, to a prescribed primary storage control device 10 via the data input/output paths CN11 (S131). Here, the prescribed primary storage control device 10 is any of the primary storage control devices 10 having a primary volume group 540A corresponding to the extended group 550 which is a suspend object.

Upon receiving this purge suspend request, the primary storage control device 10 notifies the secondary storage control device 20 of reception of the purge suspend request via the remote copy paths CN12 (S132).

A configuration is also conceivable in which a primary storage control device 10 transfers write data to a secondary storage control device 20 in response to a write data transfer request (write data read request) from the secondary storage control device 20 to the primary storage control device 10. In this case, a configuration may be employed in which the primary storage control device 10, by refusing the transfer request from the secondary storage control device 20, notifies the secondary storage control device 20 of the reception of a purge suspend request. Or, the return value of the transfer request from the primary storage control device 10 to the secondary storage control device 20 is used to notify the secondary storage control device 20 of reception of a purge suspend request.

Upon notifying the secondary storage control device 20 of reception of a purge suspend request, the primary storage control device 10 halts generation of new write data management information related to the primary volume group 540A (S133). This halting of write data management information generation continues until remote copying is resumed. Thereafter, the primary storage control device 10 uses differential bitmaps T15 to manage changed places in the primary volumes 530A in response to write requests received from the primary host 31.

The write data reception portion 210 of the secondary storage control device 20 which has been notified of the reception of a purge suspend request sets the marker type in the arrived write time management information T24 to "purge suspend", and updates the arrived write time in the arrived write time management information T24 to the marker time (S135).

Thereafter, steps similar to those in the above-described flush suspend processing are executed (S136 through S146). That is, the master processing portion 230 collects marker types and marker times, together with arrived write times, from the secondary storage control devices 20 (S136, S137), and uses the oldest arrived write time as the reflection-possible write time. The master processing portion 230 notifies each of the secondary storage control devices 20 of the reflection-possible write time and marker type (S138).

Each of the secondary storage control devices 20 updates the reflection-possible write time management information T25 (S139), and causes the write data up to the reflection-possible write time to be reflected in the secondary volumes 530B (S140). Each secondary storage control device 20 handles the write data after the reflection-possible write time using differential bitmaps T29, without reflecting the data in the secondary volumes 530B (S141).

The secondary storage control devices 20 then change the secondary volumes 530B to the "suspend state" (S142), and notify the primary storage control devices 10 of this state change via the remote copy paths CN12 (S143).

Upon notification of the change in state of the secondary volumes 530B by the secondary storage control devices 20, the primary storage control devices 10 change the primary volumes 530A to the "suspend state" (S144), and report completion of purge suspend processing to the primary host 31 (S145). By this means, the primary host 31 confirms completion of the purge suspend processing (S146).

By performing this purge suspend processing, write data up to a single time (the reflection-possible write time) can be reflected in the secondary volumes 530B of each secondary volume group 540B belonging to an extended group 550. And, copy processing can be halted without reflecting write data from after the single time in the secondary volumes 530B. That is, remote copying can be halted while ensuring data consistency.

During the period in which the master processing portion 230 is notifying the secondary storage control device 20 of the marker type (purge suspend) and reflection-possible write time in S138, there is the possibility that arrived write times may be updated in other secondary volume groups 540B other than secondary volume groups 540B which have received notification of reception of the purge suspend request.

Hence when the master processing portion 230 notifies each of the secondary storage control devices 20 of the reflection-possible write time, if a fault or similar occurs in the master processing portion 230 and a portion of the secondary storage control devices 20 cannot be notified of the reflection-possible write time and marker type, there is the possibility that arbitration processing after recovery cannot by itself ensure a halt to copying at a single unified time.

Therefore, in this embodiment, when the master processing portion 230 detects the purge suspend marker type in 5132, the master processing portion 230 issues an instruction to halt write data transfer to all storage control devices 20 which are arbitration processing objects. Upon receiving this instruction, a secondary storage control device 20 performs processing to temporarily halt write data transfer. By this means, even when a portion of the secondary storage control devices 20 cannot be notified of the reflection-possible write time and marker type due to a fault in the master processing portion 230, simply by performing arbitration processing after recovery of the master processing portion 230, remote copy processing can be halted at a single unified time.

In the case of a configuration in which requests to transfer write data are sent from secondary storage control devices 20 to primary storage control devices 10 as described above, by halting the issuing of write data transfer requests from secondary storage control devices 20 to primary storage control devices 10, write data transfer from primary storage control devices 10 to secondary storage control devices 20 can be halted.

In the processing shown in FIG. 18, even in the case of a secondary volume group 540B for which notification of purge suspend request reception has been received, until notification of the reflection-possible write time and marker type is received from the master processing portion 230 (S138), halting of reflection processing and differential management are not performed (S140, S141). In place of this, by halting reflection processing and beginning differential management from the time of reception of purge suspend request reception notification from the primary storage control device 10 (S132), purge suspend processing can be shortened.

Figure 19:
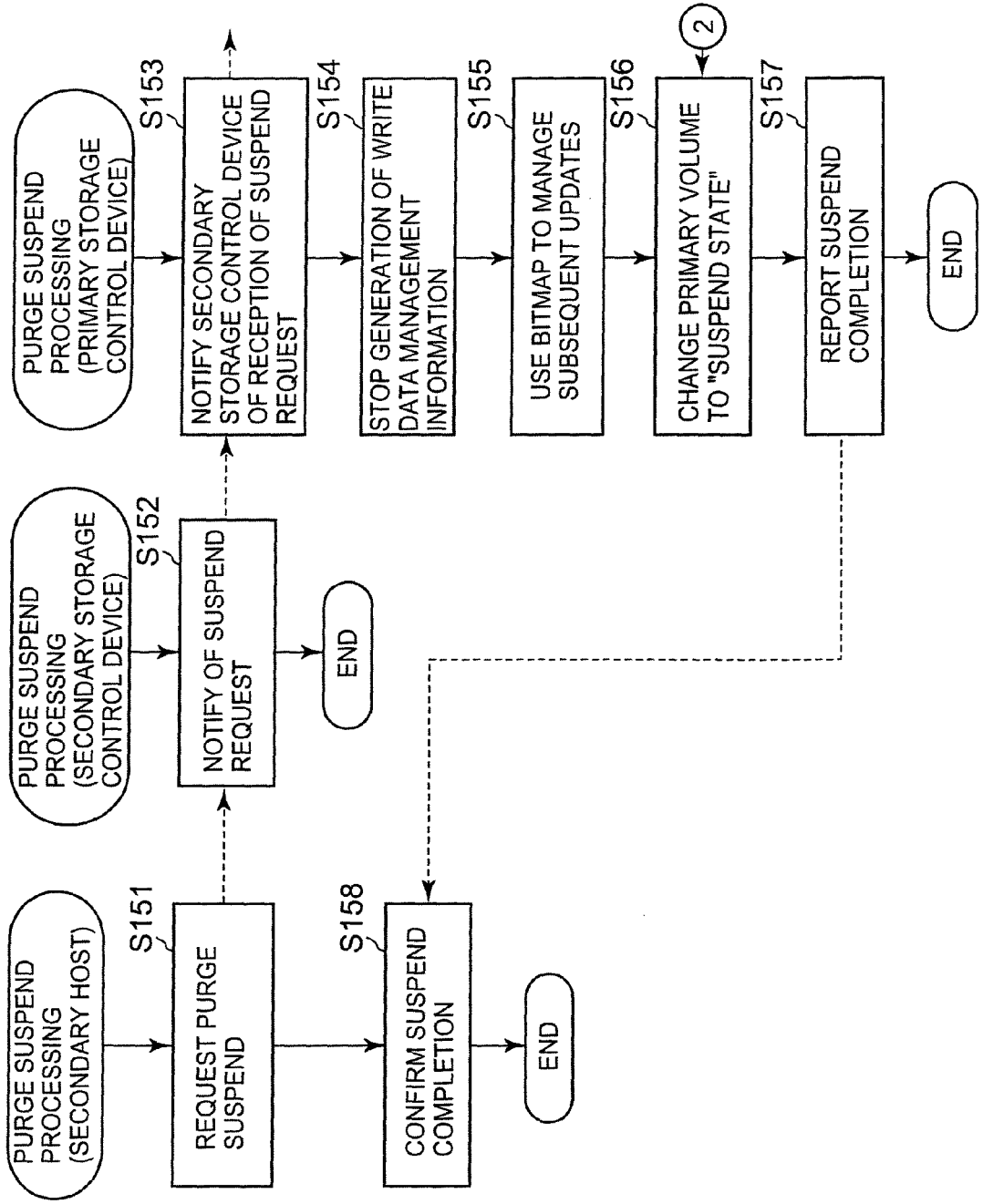
FIG. 19 is a flowchart for a case in which purge suspend processing is executed through an instruction from a secondary host.

FIG. 19 is a flowchart showing processing when a purge suspend request is issued from the secondary host 32. The management portion 312 of the secondary host 32 notifies a prescribed secondary storage control device 20 of a suspend request which specifies "purge" as the suspend type, via the data input/output paths CN11 (S151). A prescribed secondary storage control device 20 is one of the secondary storage control devices 20 having a secondary volume group 540B belonging to the extended group 550 which is the suspend object.

Upon receiving the purge suspend request, the secondary storage control device 20 notifies the primary storage control device 10 of this suspend request via the remote copy paths CN12 (S152). Upon receiving the suspend request notification, the primary storage control device 10 notifies the secondary storage control device 20 of reception of the purge suspend request via the remote copy paths CN12 (S153).

Next, the primary storage control device 10 halts creation of write data management information relating to write requests to the primary volume group 540A (S154), and for write requests received from the primary host 31 thereafter, uses differential bitmaps T15 to manage changed places in the primary volumes 530A (S155).

In subsequent processing, steps similar to the steps related to a purge suspend request issued from the primary host 31 are executed. The primary storage control device 10, upon receiving notification from the secondary storage control device 20 that the secondary volumes 530B have been changed to the "suspend state", changes the primary volumes 530A to the "suspend state" (S168). The primary storage control device 10 reports the completion of suspend processing to the secondary host 32 (S169). By this means, the secondary host 32 confirms the completion of purge suspend processing (S170).

In this way, even when a purge suspend request is issued from the secondary host 32, write data from before a single time is reflected in each of the secondary volumes 530B of each of the secondary volume groups 540B belonging to the extended group 550, and copy processing can be halted without reflecting write data from after the single time in the secondary volumes 530B. That is, remote copying can be halted while ensuring data consistency.

Embodiment 4

Next, processing when swap suspend is to be performed based on an instruction from the secondary host 32 is explained. When a standby secondary host 32 is used, a swap suspend request is issued in order to enable use of data stored in the secondary volumes 530B of secondary storage control devices 20. That is, when task processing is to be taken over by the secondary site Ss from the primary site Ps, at which processing has stopped due to a fault or similar, the secondary host 32 issues a swap suspend request.

When using the secondary host 32, it is possible that the primary host 31 used in normal operations cannot be utilized. Hence, suspend processing is performed without using the primary host 31. In order to cause the secondary host 32 to take over the task processing of the primary host 31, the write data being received by the primary storage control devices 10 is all reflected in the secondary volumes 530B. That is, when performing the swap suspend processing described below while the issuing of write requests by the primary host 31 is halted, write data received up to that time by the primary storage control devices 10 for primary volume groups 540A corresponding to the extended group 550 which is the suspend object is all reflected in the secondary volumes 530B of the secondary volume groups 540B of the secondary storage control devices 20.

As swap suspend processing, the following three types of processing are possible. The three types are described in order, from the first swap suspend processing to the third swap suspend processing.

Figure 20:
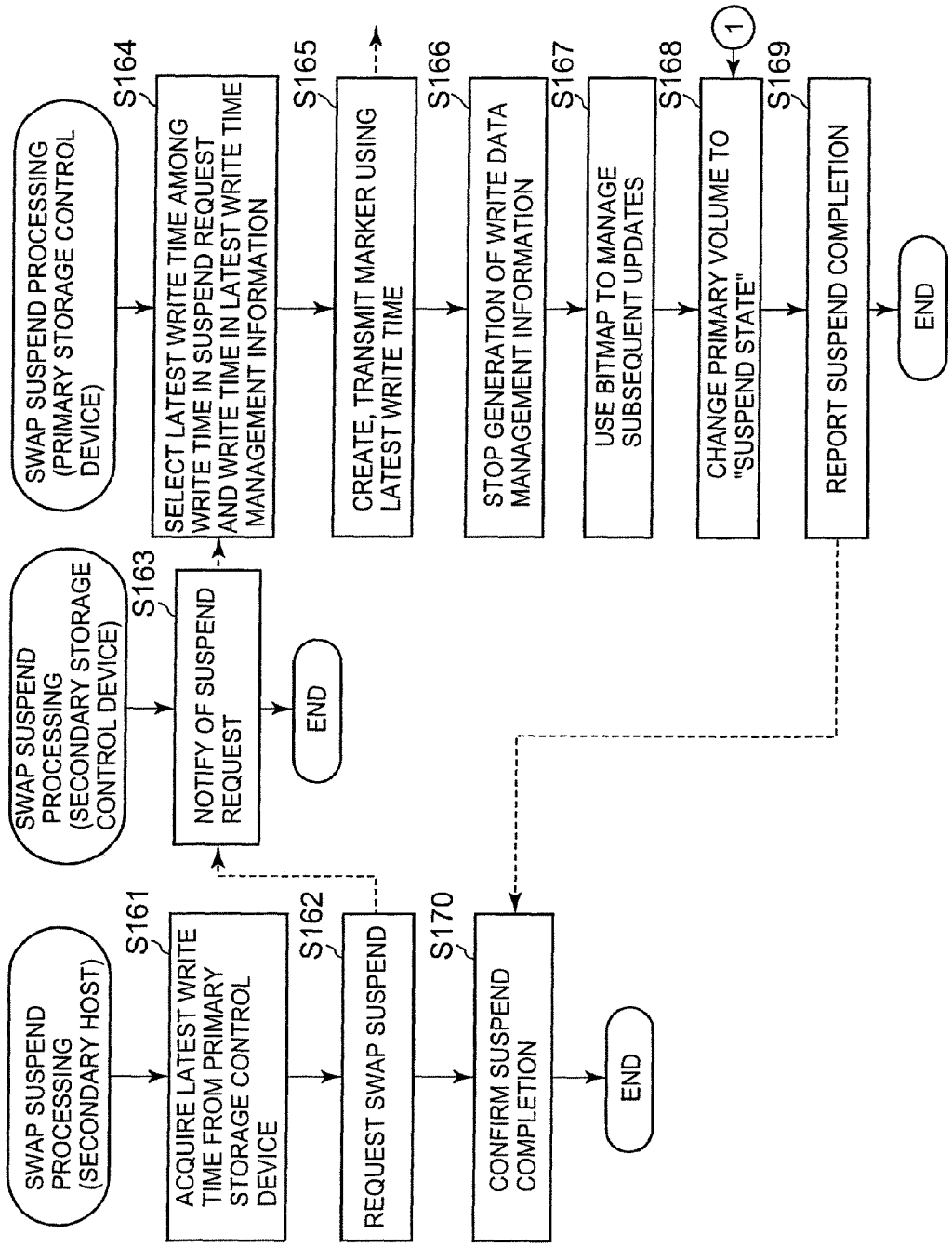
FIG. 20 is a flowchart showing first swap suspend processing, executed in the storage system of a fourth embodiment.

FIG. 20 is a flowchart showing the first swap suspend processing. The management portion 312 of the secondary host 32 collects the latest write times for prescribed primary volume groups 540A from the primary storage control devices 10, and acquires the latest write time (the write time which is the latest in time) from among the collected write times (S161).

A prescribed primary volume group 540A is a volume group 540A corresponding, as a source, to the extended group 550 which is the suspend object. The secondary host 32 can collect the latest write times from primary storage control devices 10 via a plurality of paths. The secondary host 32 can collect the latest write times from each of the primary storage control devices 10 via data input/output paths CN11 within the secondary site Ss and secondary storage control devices 20 as well as remote copy paths CN12 as a first collection path. As a second collection path, the secondary host 32 can collect the latest write times from primary storage control devices 10 via the management network CN14 and primary host 31, and the data input/output paths CN11 within the primary site Ps.

The secondary host 32 issues a swap suspend request to a prescribed secondary storage control device 20 (S162). A prescribed secondary storage control device 20 is any one secondary storage control device 20 having a secondary volume group 540B belonging to the extended group 550 which is the suspend object. The swap suspend request issued in 5162 comprises the latest write time acquired in 5161, and the suspend type is set to "swap". This swap suspend request is transmitted to the prescribed secondary storage control device 20 via the data input/output paths CN11 within the secondary site Ss.

Having received the swap suspend request, the secondary storage control device 20 notifies the primary storage control device 10 of the swap suspend request via the remote copy paths CN12 (S163). The marker creation portion 130 of the primary storage control device 10 which has received the swap suspend request compares the latest write time set in the suspend request with the write time recorded in the latest write time management information T14, and updates the write time recorded in the latest write time management information T14 (S164). That is, the marker creation portion 130 selects the later write time among the write time set in the swap suspend request and the write time recorded in the latest write time management information T14, and uses this selected write time to update the write time in the latest write time management information T14.

The marker creation portion 130 then creates a marker similar to the case of a flush suspend request issued from the secondary host 32 as described above, and transmits the marker thus created to the secondary storage control device 20 (S165). That is, the marker creation portion 130 sets the write time selected in 5164 in the marker. The marker type set in this marker is "swap suspend".

In the subsequent processing, processing similar to that for a flush suspend request issued from the primary host 31 and described above is performed (S166 through S170). That is, the primary storage control device 10 halts generation of write management information for the primary volumes 530A (S166), and begins differential management using a differential bitmap T15 (S167). The primary storage control device 10, upon receiving notification from the secondary storage control device 20 that the secondary volumes 530B have been changed to the "suspend state", change the primary volumes 530A to the "suspend state" (S168), and notify the secondary host 32 of the completion of swap suspend processing (S169). By this means, the secondary host 32 confirms the completion of swap suspend processing (S170).

Figure 21:
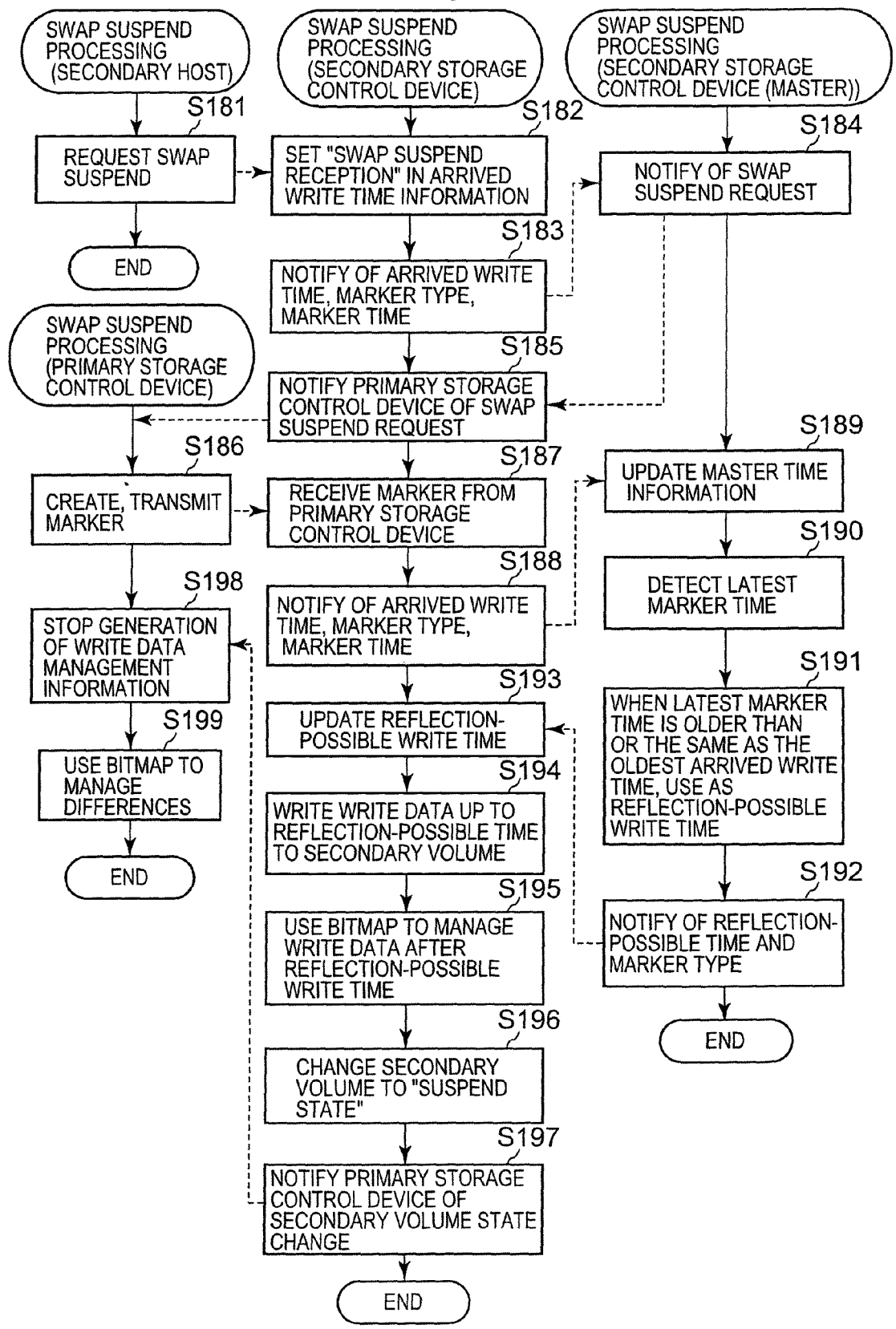
FIG. 21 is a flowchart showing second swap suspend processing.

FIG. 21 is a flowchart showing the second swap suspend processing. The management portion 312 of the secondary host 32 issues a suspend request, with the suspend type set to "swap", to a prescribed secondary storage control device 20 (S181). Similarly to the above, the prescribed secondary storage control device 20 is any one secondary storage control device among the secondary storage control devices 20 having a secondary volume group 540B belonging to the extended group 550 which is the suspend object. The secondary host 32 cannot use the timer which has been used by the primary host 31, and so does not set an issue time in the swap suspend request.

Having received the swap suspend request, the secondary storage control device 20 sets the marker type within the arrived write time management information T24 for the secondary volume group 540B which is the suspend object to "swap suspend request reception" (S182).

When the master processing portion 230 queries the secondary storage control device 20 for the arrived write time in order to perform arbitration processing, the secondary storage control device 20, having received the swap suspend request, notifies the master processing portion 230 of the arrived write time, marker type and marker time (S183). The master processing portion 230 notifies each of the secondary storage control devices 20 related to the extended group 550 which is the suspend object of the suspend swap request (S184).

The secondary storage control devices 20, having been notified of the swap suspend request by the master processing portion 230, notify the primary storage control devices 10 of the swap suspend request (S185). The marker creation portion 130 of a primary storage control device 10 which has received a swap suspend request creates a marker, similarly to the processing of a flush suspend request from the secondary host 32 described above. This marker is transmitted to the secondary storage control device 20 (S186).

That is, the marker creation portion 130 sets in the marker the write time recorded in the latest write time management information T14, and sets the marker type to "swap suspend". Here, the primary storage control device 10 does not halt creation of write data management information for primary volume groups 540A at the time of marker creation, and does not perform differential management using a differential bitmap T15.

Having received the marker requesting swap suspend from the primary storage control device 10 (S187), the secondary storage control device 20 again receives an arrived write time query from the master processing portion 230. The secondary storage control device 20 notifies the master processing portion 230 of the arrived write time, marker type, and marker time (S188).

The master processing portion 230 records the arrived write time, marker type, and marker time received from the secondary storage control device 20 in the master time information T28 (S189). The master processing portion 230 sets the marker type to "swap suspend" and sets the marker time in the master time information T28 for all secondary volume groups 540B belonging to the extended group 550 which is the suspend object, compares the marker time for each secondary volume group 540B, and detects the single newest marker time (S190).

The master processing portion 230 compares the arrived write time using the master time information T28, and determines the oldest arrived write time. When the oldest marker time detected in 5190 is as old as or the same as the arrived write time thus determined, the master processing portion 230 selects the detected marker time as the reflection-possible write time (S191). The master processing portion 230 notifies each secondary storage control device 20 of this reflection-possible write time and of the marker type (swap suspend) (S192).

The above processing is similar to the processing for a flush suspend request described above (S193 through S199). That is, a secondary storage control device 20, having received notification of the reflection-possible write time and marker type, updates the reflection-possible write time in the reflection-possible write time management information T25 (S193), and reflects write data up to the reflection-possible write time in the secondary volumes 530B (S194).

Then, the secondary storage control device 20 manages write data after the reflection-possible write time using a differential bitmap T29, without writing the data to the secondary volumes 530B (S195). The secondary storage control device 20 then changes the secondary volumes 530B to the "suspend state (read/write possible)" (S196).

The secondary storage control device 20 notifies the primary storage control device 10 of the change in state of the secondary volumes 530B via the remote copy paths CN12 (S197). On receiving this notification, the primary storage control device 10 halts the creation of write data management information for the primary volume group 540A (S198), and manages subsequently occurring write requests using a differential bitmap T15 (S199).

Figure 22:
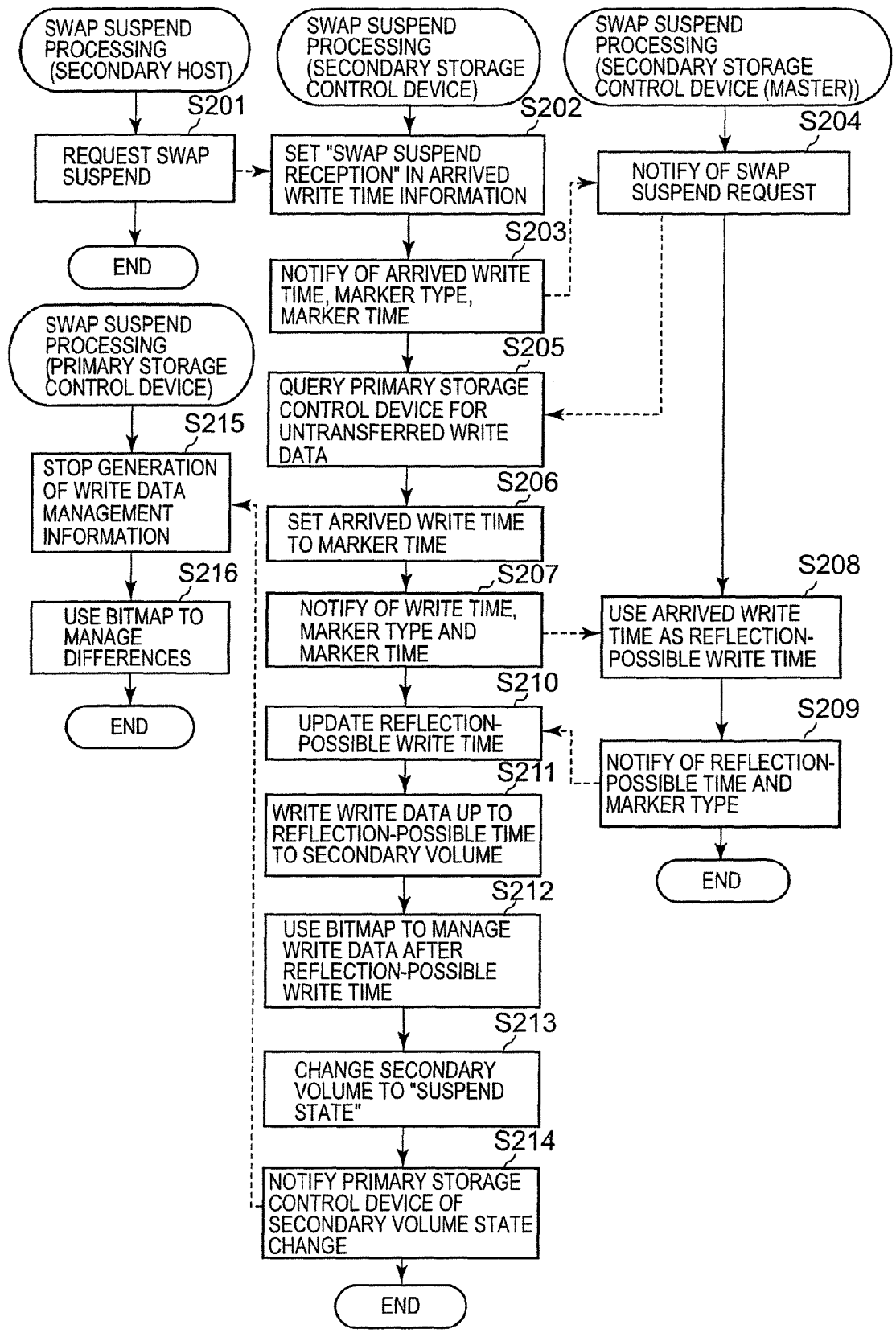
FIG. 22 is a flowchart showing third swap suspend processing.

FIG. 22 is a flowchart showing the third swap suspend processing.

The management portion 312 of the secondary host 32 issues, via the data input/output paths CN11, a suspend request, with the suspend type set to "swap", to any one of the secondary storage control devices 20 having a secondary volume group 540B belonging to the extended group 550 which is the suspend object (S201). However, the secondary host 32 does not set the time of issue in the swap suspend request.

Having received the suspend request from the secondary host 32, the secondary storage control device 20 sets the marker type in the arrived write time management information T24 for the secondary volume group 540B to "swap suspend request reception" (S202). When the secondary storage control device 20, upon receiving an arrived write time query from the master processing portion 230, notifies the master processing portion 230 of the arrived write time, marker type, and marker time (S203).

The master processing portion 230 notifies each of the secondary storage control devices 20 related to the extended group 550 which is the suspend object of the swap suspend request (S204). Having received this suspend request, a secondary storage control device 20 queries the primary storage control device 10 to determine whether or not there exists untransferred write data for the primary volume group 540A which is the copy source (S205). This query can be performed periodically or irregularly.

The secondary storage control device 20, at the time of detection that there exist no untransferred or not-yet-arrived write data based on the untransferred sequential number or similar for the primary volume group 540A, records the arrived write time as the marker time in the arrived write time management information T24 for the secondary volume group 540B, and sets the marker type to "swap suspend" (S206).

Similarly to the above processing, in arbitration processing the master processing portion 230 is notified of the arrived write time, marker type and similar (S207). The master processing portion 230 selects the arrived write time as the reflection-possible write time (S208), and notifies each of the secondary storage control devices 20 of the reflection-possible write time and marker type (S209).

Upon receiving this notification, a secondary storage control device 20 updates the reflection-possible write time management information T25 (S210), and performs processing similar to that above (S211 through S214).

That is, the secondary storage control device 20 writes the write data up to the reflection-possible write time to the secondary volumes 530B (S211). For write data later than the reflection-possible write time, the secondary storage control device 20 manages modified places using a differential bitmap T29, without writing the data to the secondary volumes 530B (S212).

The secondary storage control device 20 then changes the secondary volumes 530B to the "suspend state (read/write possible)" (S213), and notifies the primary storage control device 10 of this change in state (S214).

Upon receiving the notification of a change in state of the secondary volumes 530B, the primary storage control device 10 halts creation of write data management information for write requests for the primary volume group 540A (S215). For write requests received after the creation of write data management information has been halted, the primary storage control device 10 manages modified places in the primary volumes 530A using a differential bitmap T15 (S216).

By means of the above processing, all the write data which has been received by a primary storage control device 10 for a primary volume group 540A related to the extended group 550 which is the suspend object is reflected in the secondary volumes 530B of the secondary volume group 540B, and remote copy processing can be halted. The primary host 31 is not used in this suspend processing.

Each of the above-described types of suspend processing has been described assuming that reports of information relating to markers send from a secondary storage control device 20 to the master processing portion 230, and notification from the master processing portion 230 to the secondary storage control device 20, are performed together with arbitration processing. However, a configuration may also be adopted in which reports relating to markers and notification from the master processing portion 230 to the secondary storage control device 20 are performed through separate communication independently of arbitration processing.

Further, in each of the above types of suspend processing, the extended group 550 which is the suspend object can be specified by explicitly specifying the extended group ID as a parameter of the suspend request; or, by specifying any of the secondary volume groups 540B or secondary volumes 530B belonging to the extended group 550, suspend processing for the extended group 550 to which these belong can be initiated.

Embodiment 5

Figure 23:
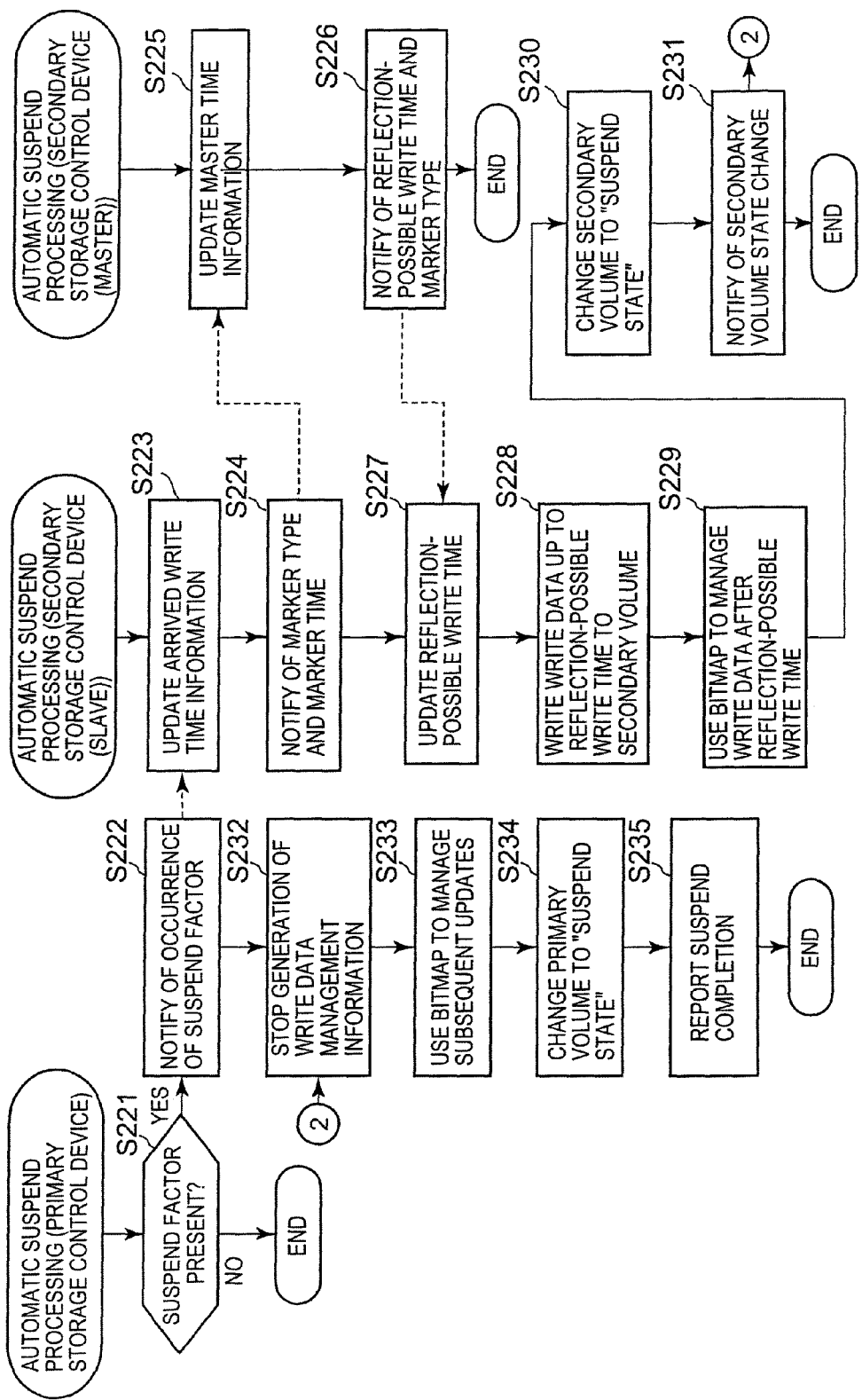
FIG. 23 is a flowchart showing suspend processing executed automatically when a fault or other suspend factor is detected.

Next, FIG. 23 is a flowchart showing processing for a case in which a fault or other suspend factor is automatically detected and suspend processing is performed.

Each of the above-described types of suspend processing have been executed based on a suspend request issued from either the primary host 31 or the secondary host 32. However, in addition to processing based on an explicit instruction from either of the hosts 31 or 32, there may be a need to execute suspend processing due to other factors as well.

For example, when remote copy processing cannot be continued due to a fault in the remote copy paths CN12 or similar, there may be a need to automatically perform suspend processing. Also, in the above-described third swap suspend processing, when it is not possible to detect within a fixed length of time (which can be set by the user) the fact that there exists no write data which has not been transferred or has not arrived, then there is again a need to automatically halt remote copy processing.

Hence in the processing of FIG. 23, suspend processing is executed automatically when a suspend factor is detected. First, a suspend factor is detected by any one of the primary storage control devices 10 or secondary storage control devices 20. When a suspend factor is detected by a primary storage control device 10 (S221: YES), the secondary storage control device 20 is notified of detection of the suspend factor via the remote copy paths CN12 (S222).

The method of notification of a suspend factor is similar to the method of notification of suspend request reception in processing of a purge suspend request issued by the primary host 31. The secondary storage control device 20 which has detected a suspend factor, or the secondary storage control device 20 which has received notification of a suspend factor, sets "fault suspend" (or, if during processing of a swap suspend, "swap suspend") as the marker type in the arrived write time management information T24. The secondary storage control device 20 records the arrived write time recorded in the arrived write time management information T24 as the marker time (S223).

The subsequent processing is similar to the above-described purge suspend processing (S224 through S235). That is, the master processing portion 230 collects the arrived write time, marker type and marker time from the secondary storage control device 20 (S224, S225). The master processing portion 230 determines the reflection-possible write time as the latest arrived write time, and notifies each of the secondary storage control devices 20 of the reflection-possible write time and the marker type (S226).

The secondary storage control device 20 updates the reflection-possible write time within the reflection-possible write time management information T25 (S227). Then, the secondary storage control device 20 writes the write data up to the reflection-possible write time, in order, to the secondary volumes 530B (S228). The secondary storage control device 20 uses a differential bitmap T29 in differential management of write data after the reflection-possible write time, without writing the data to the secondary volumes 530B (S229).

The secondary storage control device 20 changes the secondary volumes 530B to the "suspend state" (S230). However, in the case of swap suspend, the secondary storage control device 20 changes the secondary volumes 530B to the "suspend state (read/write possible)". The primary storage control device 10 is notified of this change in state of the secondary volumes 530B (S231).

Upon receiving the state change notification for the secondary volumes 530B, the primary storage control device 10 halts creation of write data management information for the primary volumes 530A (S232), and uses a differential bitmap T15 to manage subsequently issued write requests (S233). The primary storage control device 10 then changes the primary volumes 530A to the "suspend state" (S234), and notifies external devices of the completion of suspend processing (S235).

By means of the above processing, write data arriving at each secondary storage control device 20 before a single time is reflected in the respective secondary volumes 530B of each of the secondary volume groups 540B belonging to the extended group 550, and remote copy processing can be halted without reflecting write data after this single time in the secondary volumes 530B. That is, suspend can be executed with data consistency ensured.

When recovering from the suspend state, if necessary the suspend factor is removed, and an instruction is issued to resume remote copying to each of the secondary volume groups 540B. By means of the instruction to resume remote copying, establish copy processing is performed, and the states of the secondary volumes 530B belonging to the above secondary volume groups 540B are restored.

In the above-described automatic suspend processing, remote copy processing is halted for secondary volumes 530B of all secondary volume groups 540B belonging to the extended group 550. In place of this, a configuration may be employed in which remote copy processing is halted only for those secondary volume groups 540B or secondary volumes 530B for which remote copy processing cannot be continued due to a fault. In this case, remote copying can be continued for other secondary volume groups 540B which are able to continue remote copy processing. This can for example be realized by having the master processing portion 230 issue notification of the marker type only for secondary volume groups 540B related to the occurrence of the fault, and excluding secondary volume groups 540B related to the fault occurrence from the subsequent arbitration processing. By means of such processing, remote copying can be continued for other, normal secondary volume groups 540B, and the size of the differential bitmap T29 used can be reduced. As a result, the establish copy volume and the time required for establish copying when remote copy processing is resumed can be reduced.

In the above-described automatic suspend processing, the marker type is used as the notification contents and instruction contents in notifications and instructions exchanged between the master processing portion 230 and secondary storage control device 20. In place of this, for example, a "suspend processing instruction" or other type of notification or instruction may be used.

This invention is not limited to the above-described aspects. A practitioner of the art can make various additions, modifications and similar within the scope of the invention. For example, the various embodiments can be combined as appropriate.

Cases were described in which a management portion 311 was provided in the primary host 31 and a management portion 312 was provided in the secondary host 32; but other configurations are possible, and management portions may be provided in the primary storage control devices 10, secondary storage control devices 20, management terminals 41 and 42, and management server 43.

Further, cases were explained in which a master processing portion 230 was provided in any one of the secondary storage control devices 20; but other configurations are possible, and master processing portions may be provided in, for example, each of the hosts 31 and 32, the primary storage control devices 10, the management terminal 42, the management server 43, or similar, to perform arbitration processing. Moreover, master processing portions may be provided in advance in each of the secondary storage control devices 20, and any one or a plurality of master portions can either be started automatically, or can be manually selected and started.

Further, cases were described in which a write time assigned to write data by the primary host 31 at the time of the write request is used to control the order of data reflection; but instead, sequential numbers alone can be used to control the order of data reflection. For example, each time each of the storage control devices 10, 20 receives write data and a suspend request, consecutive numbers without gaps can be set, to ascertain the precedence relation between write data sets. Numbers may be consecutive numbers used in common at the primary site Ps and secondary site Ss.

Further, cases were described in which each of the storage control devices 10, 20 incorporate disk drives 521; but other configurations utilizing external storage resources may be employed. That is, at least one among the primary storage control devices 10 and secondary storage control devices 20 can use storage devices existing outside their own housings as if the storage device were incorporated within their own housings. For example, virtual intermediate devices may be provided within the storage control devices 10, 20, and by mapping logical volumes provided within a separate external housing to these intermediate storage devices, the external storage devices can be used as if they were the storage control devices' own internal storage devices.

What is claimed is:

1. A storage system managing a plurality of asynchronous remote copy procedures between a plurality of first storage control devices and a plurality of second storage control devices, the storage system comprising:

the plurality of first storage control devices each having a plurality of first channel adapters for receiving data, a first cache memory for storing data and a plurality of first disk adapters for transferring data to a plurality of first disk drives; and the plurality of second storage control devices each having a plurality of second channel adapters for receiving data, a second cache memory for storing data and a plurality of second disk adapters for transferring data to a plurality of second disk drives, wherein each of the plurality of first storage control devices manages a first logical volume, and receives update data sent from a higher-level device to the first logical volume, and stores the update data to the first logical volume, and transfers the update data with update order information, specifying update order of the update data, to one of the plurality of second storage control devices according to one of the plurality of asynchronous remote copy procedures, wherein each of the plurality of second storage control devices manages a second logical volume corresponding to one of a plurality of the first logical volumes, and receives the update data and the update order information sent from one of the plurality of first storage control devices according to the one of the plurality of asynchronous remote copy procedures, and stores the update data to the second logical volume based on the update order information, wherein each of the plurality of first storage control devices receives a suspend request instructing to suspend the one of the plurality of asynchronous remote copy procedures from the higher-level device, and generates a marker for suspending the one of the plurality of asynchronous remote copy procedure, and transfers the marker to the one of the plurality of second storage control devices, wherein the plurality of second storage control devices includes a grouped plurality of second storage control devices with one of the grouped plurality of second storage control devices being a master second storage control device, each grouped second storage control device of the grouped plurality of second storage control devices receives the marker from the one of the plurality of first storage control devices, and responsive to a polling from the master second storage control device, sending the marker and one of a plurality of update order information currently held by the grouped second storage control device to the master second storage control device, wherein the master second storage control device determines an oldest update data indicated in the plurality of update order information from the grouped plurality of second storage control devices, and uses the oldest update data to decide an update reflection information indicating which update data is to be updated in the grouped plurality of second storage control devices to synchronize updated data across the grouped plurality of second storage control devices, each grouped second storage control device of the grouped plurality of second storage control devices receives information of the marker and the update reflection information, indicating which update data to be updated to the second logical volume, from the master second storage control device, and stores the update data based on the update reflection information, and changes status of the second logical volume to suspend status.

2. The storage system as claimed in claim 1, wherein the suspend request is more particularly a flush suspend request, wherein, responsive to the flush suspend request: said each of the plurality of first storage control devices effects the generates and transfers operations to implement a flush suspend process; the master second storage control device effects the determines and uses operations to implement the flush suspend process; and each of the plurality of second storage control devices effects the receives and stores operations to implement the flush suspend process, and then changes status of the second logical volume to the suspend status.

3. The storage system as claimed in claim 1, wherein the suspend request is more particularly a purge suspend request, wherein, responsive to the purge suspend request: said each of the plurality of first storage control devices effects the generates and transfers operations to implement a purge suspend process; the master second storage control device effects the determines and uses operations to implement the purge suspend process; and each of the plurality of second storage control devices effects the receives and stores operations to implement the purge suspend process, and then changes status of the second logical volume to the suspend status.

* * * * *